(12) United States Patent
Nakayama et al.

(10) Patent No.: US 8,153,250 B2
(45) Date of Patent: Apr. 10, 2012

(54) DOUBLE-FACED PRESSURE-SENSITIVE ADHESIVE TAPE

(75) Inventors: Naoki Nakayama, Ibaraki (JP); Hiroyuki Watanabe, Ibaraki (JP); Koichi Ikeda, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 252 days.

(21) Appl. No.: 12/591,816

(22) Filed: Dec. 2, 2009

(65) Prior Publication Data

US 2010/0143685 A1 Jun. 10, 2010

(30) Foreign Application Priority Data

Dec. 4, 2008 (JP) ................................. 2008-309929
Oct. 2, 2009 (JP) ................................. 2009-230283

(51) Int. Cl.
B32B 3/26 (2006.01)
B32B 3/00 (2006.01)
B32B 7/12 (2006.01)

(52) U.S. Cl. ...................... 428/343; 428/354; 428/304.4; 428/314.8; 428/315.9; 428/317.3

(58) Field of Classification Search .................. 428/343, 428/354, 304.4, 314.8, 315.9, 317.3
See application file for complete search history.

(56) References Cited

U.S. PATENT DOCUMENTS

| | | | | |
|---|---|---|---|---|
| 4,839,206 A | * | 6/1989 | Waldenberger | 428/41.5 |
| 6,521,309 B1 | * | 2/2003 | Chen et al. | 428/40.1 |
| 6,608,143 B1 | * | 8/2003 | Fukuoka et al. | 525/309 |

FOREIGN PATENT DOCUMENTS

| | | | |
|---|---|---|---|
| EP | 2141211 A2 | | 1/2010 |
| JP | 64-026692 A | | 1/1989 |
| JP | 05043843 A | * | 2/1993 |
| JP | 08157787 A | * | 6/1996 |
| JP | 2001-152111 A | | 6/2001 |
| JP | 2004-323842 A | | 11/2004 |
| JP | 2005-097566 A | | 4/2005 |
| JP | 2007-080702 A | | 3/2007 |
| JP | 2008-250309 A | | 10/2008 |
| WO | WO-2006/097282 A1 | | 9/2006 |

OTHER PUBLICATIONS

Office Action dated Dec. 7, 2010, for Japanese Patent Application No. 2009-230283.
Final Rejection for Japanese Patent Application No. 2009-230283 dated Feb. 22, 2011.
European Search Report dated Mar. 2, 2010, issued on the European Patent Application No. 09177902.5.
Notification mailed Sep. 27, 2011, issued from Japan Patent Office for Japanese patent application No. 2009-230283 and English translation thereof.

* cited by examiner

*Primary Examiner* — Victor Chang
(74) *Attorney, Agent, or Firm* — Edwards Wildman Palmer LLP

(57) ABSTRACT

Disclosed is a double-faced pressure-sensitive adhesive tape which includes a foam substrate, one pressure-sensitive adhesive layer arranged on or above one side of the substrate, and another pressure-sensitive adhesive layer arranged on or above the other side of the substrate. The adhesive tape has a total thickness of 250 μm or less. The adhesive tape is thin but highly waterproof (sealable against water). The adhesive tape preferably has a tensile strength of 0.5 to 20 MPa for further superior processability.

20 Claims, 7 Drawing Sheets

(a)

(b)

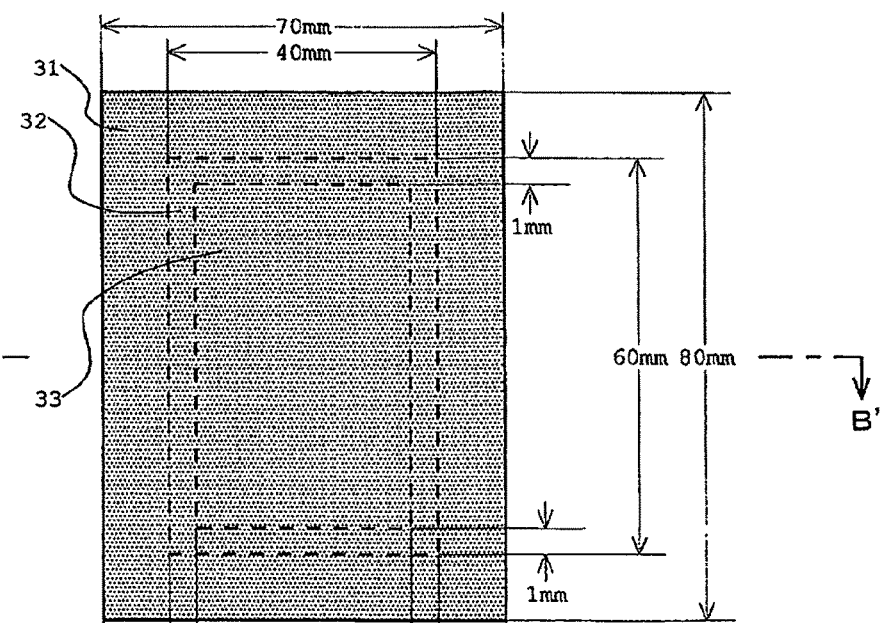
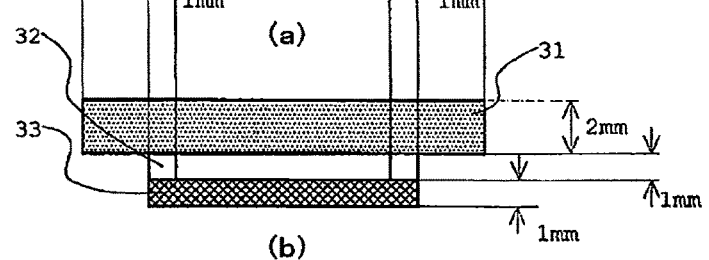

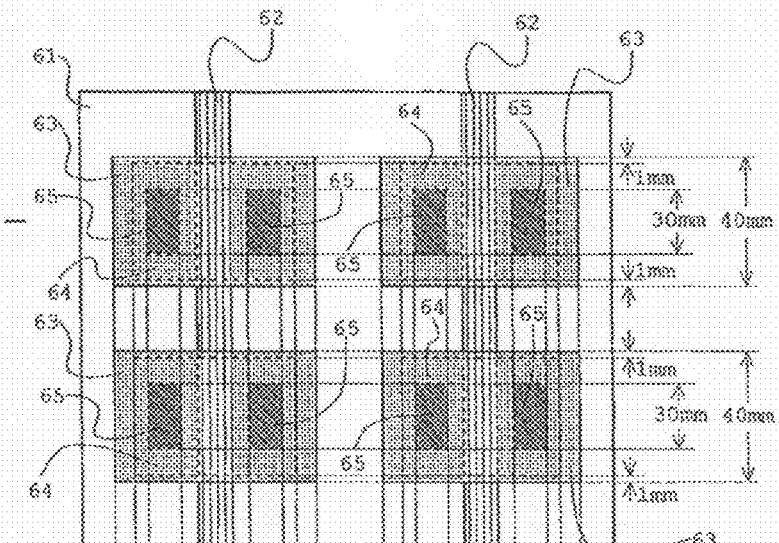
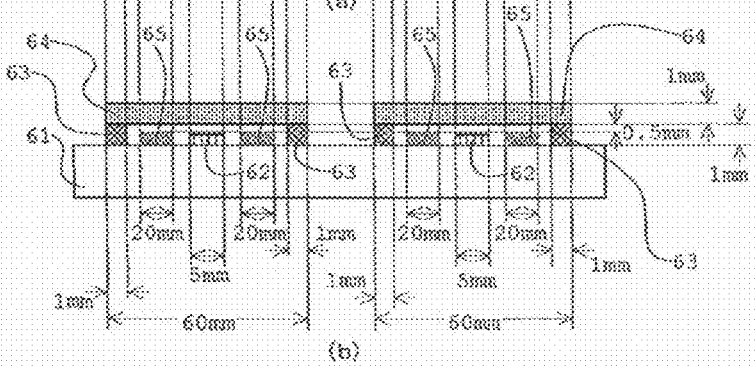

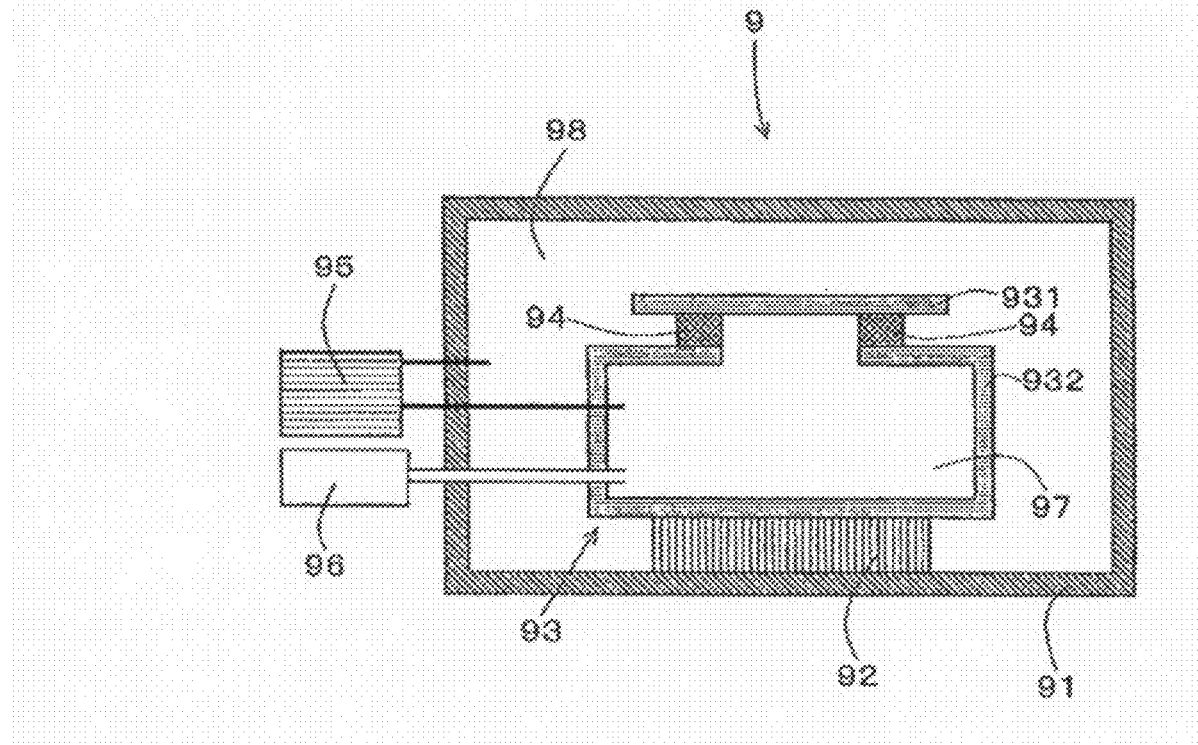

DOUBLE-FACED PRESSURE-SENSITIVE ADHESIVE TAPE

BACKGROUND OF THE INVENTION

1. Field of the Invention

The present invention relates to double-faced pressure-sensitive adhesive tapes that are thin and highly waterproof.

2. Description of the Related Art

Substrate-supported double-faced pressure-sensitive adhesive tapes (double-coated self-adhesive tapes) have been used for various purposes such as bonding and fixation. These substrate-supported double-faced pressure-sensitive adhesive tapes each include a substrate (carrier) and arranged on both sides thereof, pressure-sensitive adhesive layers (self-adhesive layers). Typically, some of them use, as the substrate, nonwoven fabrics (Japanese Unexamined Patent Application Publication No. 2001-152111), paper, or plastic films.

As the function of waterproofing has been required of cellular phones, substrate-supported double-faced pressure-sensitive adhesive tapes used for the fixation or fastening of components in such cellular phones should be waterproof (be sealable against water). The known substrate-supported double-faced pressure-sensitive adhesive tapes, however, fail to provide satisfactory waterproofness. Typically, nonwoven fabrics and paper, if used as a material for the substrate, are impregnated with water (absorb water) and the resulting substrate-supported double-faced pressure-sensitive adhesive tapes are inferior in waterproofness. Plastic films, if used as a material for the substrate, are relatively rigid, and the resulting substrate-supported double-faced pressure-sensitive adhesive tapes do not satisfactorily fit uneven or rough portions (portions differing in level), thereby suffer from gap in such uneven portions, and show unsatisfactory waterproofness.

In addition, such substrate-supported double-faced pressure-sensitive adhesive tapes should be reduced in thickness for the reduction in weight, size, and thickness of products in which the tapes are used. And, even when they are reduced in thickness, they should undergo processing satisfactorily.

SUMMARY OF THE INVENTION

Accordingly, an object of the present invention is to provide a double-faced pressure-sensitive adhesive tape which is thin and highly waterproof (satisfactorily sealable against water).

Another object of the present invention is to provide a double-faced pressure-sensitive adhesive tape which is thin, is highly waterproof (satisfactorily sealable against water), and, in addition, undergoes processing satisfactorily.

After intensive investigations to achieve the objects, the present inventors have found that a substrate-supported double-faced pressure-sensitive adhesive tape, if using a foam substrate and having a total thickness of 250 μm or less, is highly waterproof, even though it is thin. They also have found that the substrate-supported double-faced pressure-sensitive adhesive tape, if having a tensile strength within a specific range, more satisfactorily undergoes processing. The present invention has been made based on these findings.

Specifically, in an embodiment, the present invention provides a double-faced pressure-sensitive adhesive tape which includes a foam substrate, one pressure-sensitive adhesive layer arranged on or above one side of the substrate, and another pressure-sensitive adhesive layer arranged on or above the other side of the substrate, and which has a total thickness of 250 μm or less.

The double-faced pressure-sensitive adhesive tape preferably has a tensile strength of from 0.5 to 20.0 MPa.

The double-faced pressure-sensitive adhesive tape preferably has an elongation of 100% to 600%.

The total thickness of the pressure-sensitive adhesive layers arranged on both sides of the substrate is preferably from 10 to 200 μm.

The double-faced pressure-sensitive adhesive tape preferably has a compression load by 30% of from 5 to 200 kPa.

The double-faced pressure-sensitive adhesive tape preferably has a put out force of from 30 to 200 newtons (N).

The foam substrate may be a halogen-free foam substrate containing substantially no halogen compound by design.

The double-faced pressure-sensitive adhesive tape may show a chlorine-containing gas emission of 50 μg/g or less.

The foam substrate may be colored black.

In this case, the double-faced pressure-sensitive adhesive tape preferably has a visible-light transmittance of 15% or less.

The foam substrate may also be colored white.

In this case, the double-faced pressure-sensitive adhesive tape preferably has a visible-light reflectance of 20% or more.

The double-faced pressure-sensitive adhesive tape may be used, for example, in an optical component.

The double-faced pressure-sensitive adhesive tape may be used for waterproofing use.

The double-faced pressure-sensitive adhesive tape may be used for the application to an adherend having an uneven face and/or curved face.

Such double-faced pressure-sensitive adhesive tapes according to embodiments of the present invention having the above configuration are thin but are highly waterproof (satisfactorily sealable against water). The double-faced pressure-sensitive adhesive tapes, when having a tensile strength of from 0.5 to 20.0 MPa, more satisfactorily undergo processing.

These and other objects, features, and advantages of the present invention will be more fully understood from the following description of preferred embodiments with reference to the attached drawings. All numbers are herein assumed to be modified by the term "about."

BRIEF DESCRIPTION OF THE DRAWINGS

FIGS. 3A and 3B are a schematic top view and a schematic cross-sectional view along the lines B-B', respectively, of a test specimen for use in the measurement of drop impact resistance;

FIGS. 6A and 6B are a schematic top view and a schematic cross-sectional view along the lines C-C', respectively, of a test specimen for use in the testing of waterproofness;

FIG. 9 is a schematic diagram of a dust-sealability testing device.

Figure 1A:
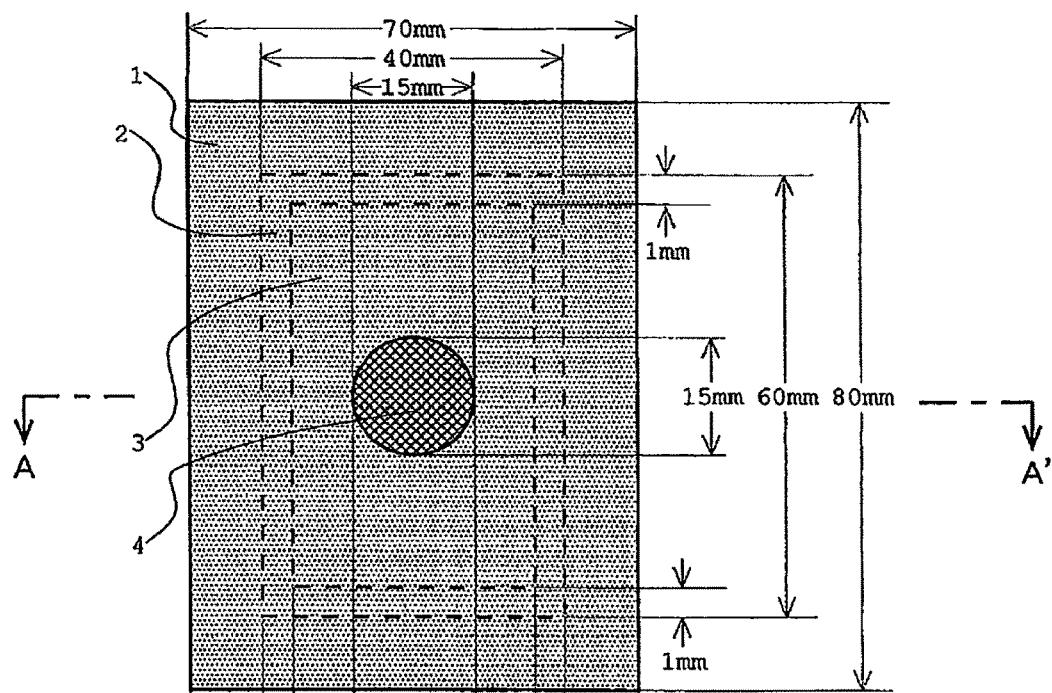
FIGS. 1A and 1B are a schematic top view and a schematic cross-sectional view along the lines A-A', respectively, of a test specimen for use in the measurement of push out force.

| Reference Numerals | |
|---|---|
| 1 | polycarbonate plate |
| 2 | frame-shaped double-faced pressure-sensitive adhesive tape |
| 3 | acrylic plate |
| 4 | through-hole of polycarbonate plate |
| 21 | round bar |
| 22 | support |
| 31 | polycarbonate plate |
| 32 | frame-shaped double-faced pressure-sensitive adhesive tape |
| 33 | acrylic plate |
| 41 | polycarbonate plate |
| 42 | double-faced pressure-sensitive adhesive tape |
| 43 | poly(ethylene terephthalate) film |
| 51 | polycarbonate plate |
| 52 | double-faced pressure-sensitive adhesive tape |
| 53 | polyester film |
| a | lifting distance |
| 61 | polycarbonate plate |
| 62 | bump tape |
| 63 | frame-shaped double-faced pressure-sensitive adhesive tape |
| 64 | acrylic plate |
| 65 | nonwoven fabric |
| 7 | pendulum impact tester |
| 71 | load cell |
| 72 | test specimen (double-faced pressure-sensitive adhesive tape) |
| 73 | acrylic plate |
| 74 | iron ball |
| 75 | pressing force controller |
| 76 | supporting plate |
| 77 | supporting shaft |
| 78 | pendulum arm |
| 8 | test specimen |
| 9 | dust-sealability testing device |
| 91 | cabinet |
| 92 | mount |
| 93 | testing chamber |
| 931 | ceiling plate of testing chamber |
| 932 | testing chamber body |
| 94 | test specimen (trim-form double-faced pressure-sensitive adhesive tape) |
| 95 | particle counter |
| 96 | suction pump |
| 97 | interior space of testing chamber |
| 98 | exterior space of testing chamber |

DESCRIPTION OF THE PREFERRED EMBODIMENTS

A pressure-sensitive adhesive tape according to an embodiment of the present invention is a substrate-supported double-faced pressure-sensitive adhesive tape (substrate-supported self-adhesive tape) which includes a foam substrate, one pressure-sensitive adhesive layer arranged on or above one side of the substrate, and another pressure-sensitive adhesive layer arranged on or above the other side of the substrate, in which the total thickness of the pressure-sensitive adhesive tape is 250 μm or less. As used herein the "total thickness" of the substrate-supported double-faced pressure-sensitive adhesive tape refers to the thickness (length) from the surface (adhesive face) of one pressure-sensitive adhesive layer to the surface (adhesive face) of the other pressure-sensitive adhesive layer. As used herein a "pressure-sensitive adhesive tape" or "self-adhesive tape" also includes one in sheet form. Namely, this term also refers to a "pressure-sensitive adhesive sheet" or "self-adhesive sheet".

The presence of a foam substrate as the substrate allows the double-faced pressure-sensitive adhesive tape to develop waterproofness and sealability against water (water sealability).

Foam Substrate

Though not especially limited, the foam substrate of the double-faced pressure-sensitive adhesive tape is preferably a plastic foam substrate. Plastic materials (including rubber materials) for constituting the plastic foam can be chosen from among known plastic materials without limitation. Each of different plastic materials can be used alone or in combination.

Specifically, exemplary plastic foams include foams containing olefinic resins, such as polyethylene foams, polypropylene foams, ethylene-propylene copolymer foams, and ethylene-vinyl acetate copolymer foams; foams containing polyesters, such as poly(ethylene terephthalate) foams, poly(ethylene naphthalate) foams, and poly(butylene terephthalate) foams; foams containing vinyl chloride resins such as poly(vinyl chloride) foams; vinyl acetate resin foams; poly(phenylene sulfide) resin foams; amide resin foams such as polyamide (nylon) foams and wholly aromatic polyamide (aramid) foams; polyimide foams; poly(ether ether ketone) (PEEK) foams; styrenic resin foams such as polystyrene foams; and urethane resin foams such as polyurethane foams. Exemplary plastic foams further include rubber resin foams.

Among them, olefinic resin foams are preferred, of which polyethylene foams and polypropylene foams are typically preferred, because these foams are satisfactorily resistant to chemicals and solvents, are resistant to moisture permeation, have good elasticity, and show satisfactory processability.

Cell form, cell size, thickness of cell wall and other properties of cells constituting the plastic foam are not especially limited and can be chosen or set from among cell properties of known plastic foams. For example, the cells constituting the plastic foam may be open cells, closed cells, or any mixture of them. The plastic foam can be prepared according to a known or common technique, such as a technique of forming a plastic foam using a blowing agent.

The foam substrate may have undergone a known surface treatment. Typically, the surface of the foam substrate facing the pressure-sensitive adhesive layer may have undergone one or more of chemical or physical surface treatments such as primer coating, corona discharge treatment, and plasma treatment. The foam substrate may have a single-layer structure or multilayer structure.

The foam substrate may contain additives according to necessity. Exemplary additives include fillers (e.g., inorganic fillers and organic fillers), age inhibitors, antioxidants, ultraviolet-absorbers, antistatic agents, lubricants, plasticizers, flame retardants, and surfactants.

The foam substrate is preferably a halogen-free foam substrate which contains substantially no halogen compound by design. This is for the purpose of avoiding corrosion of metals. More specifically, when the double-faced pressure-sensitive adhesive tape including a foam substrate as the substrate is used for the fixation of electric/electronic components, corrosion of metals due to the presence of halogen compounds should be avoided. Such halogen compounds are generally incorporated into the substrate as halogen-containing flame retardants and/or halogen-containing plasticizers.

The foam substrate may be colored so as to allow the double-faced pressure-sensitive adhesive tape to develop graphical design functions and/or optical properties such as light blocking properties and light reflecting properties. Each of different colorants can be used alone or in combination herein.

The foam substrate may be colored black when the double-faced pressure-sensitive adhesive tape is used for light blocking. When colored black, the lightness L* specified according to CIE 1976 (L*a*b*) color space is preferably 35 or less (from 0 to 35), and more preferably 30 or less (from 0 to 30). The redness-greenness a* and yellowness-blueness b* specified according to CIE 1976 (L*a*b*) color space can be suitably set respectively according to the lightness L*. The redness-greenness a* and yellowness-blueness b* both preferably range, for example, from −10 to 10, more preferably from −5 to 5, and furthermore preferably 0 or around 0 (from −2.5 to 2.5).

The foam substrate may be colored white when the double-faced pressure-sensitive adhesive tape is used for light reflecting. When colored white, the lightness L* specified according to CIE 1976 (L*a*b*) color space is preferably 87 or more (from 87 to 100). The redness-greenness a* and yellowness-blueness b* specified according to CIE 1976 (L*a*b*) color space can be suitably set respectively according to the lightness L*. The redness-greenness a* and yellowness-blueness b* both preferably range, for example, from −10 to 10, more preferably from −5 to 5, and furthermore preferably 0 or around 0 (from −2.5 to 2.5).

The lightness L*, redness-greenness a*, and yellowness-blueness b* specified according to CIE 1976 (L*a*b*) color space are determined herein through the measurement with a colorimeter (trade name "CR-200" supplied by Konica Minolta Sensing Inc.). As used herein the "CIE 1976 (L*a*b*) color space" is a color space recommended by The International Commission on Illumination (CIE) in 1976 and is also referred to as (L*a*b*) color space or CIELAB. In Japanese Industrial Standards (JIS), the CIE 1976 (L*a*b*) color space is specified in JIS Z 8729.

Exemplary black colorants usable herein include carbon blacks (e.g., furnace black, channel black, acetylene black, thermal black, and lampblack), graphite, copper oxide, manganese dioxide, aniline black, perylene black, titanium black, cyanine black, activated carbon, ferrites (e.g., non-magnetic ferrite and magnetic ferrite), magnetite, chromium oxide, iron oxide, molybdenum disulfide, chromium complexes, multicomponent oxide-based black colorants, and anthraquinone-based organic black colorants. Among them, carbon blacks are preferred, because they are available easily and inexpensively.

Exemplary white colorants include inorganic white colorants such as titanium oxides (e.g., titanium dioxides such as rutile titanium dioxide and anatase titanium dioxide), zinc oxide, aluminum oxide, silicon oxide, zirconium oxide, magnesium oxide, calcium oxide, tin oxide, barium oxide, cesium oxide, yttrium oxide, magnesium carbonate, calcium carbonates (precipitated calcium carbonate and heavy calcium carbonate), barium carbonate, zinc carbonate, aluminum hydroxide, calcium hydroxide, magnesium hydroxide, zinc hydroxide, aluminum silicate, magnesium silicate, calcium silicate, barium sulfate, calcium sulfate, barium stearate, zinc white, zinc sulfide, talc, silica, alumina, clay, kaolin, titanium phosphate, mica, gypsum, white carbon, diatomaceous earth, bentonite, lithopone, zeolite, sericite, and hydrated halloysite; and organic white colorants such as acrylic resin particles, styrene resin particles, urethane resin particles, amide resin particles, carbonate resin particles, silicone resin particles, urea-formaldehyde resin particles, and melamine resin particles.

The amount of colorants is not especially limited and can be such an amount as to allow the pressure-sensitive adhesive tape to have desired optical properties.

Typically, in an embodiment, the double-faced pressure-sensitive adhesive tape is used for light blocking. In this embodiment, the visible-light transmittance of the foam substrate is preferably 15% or less (from 0% to 15%), and more preferably 10% or less (from 0% to 10%), as with the visible-light transmittance of the entire double-faced pressure-sensitive adhesive tape.

In another embodiment, the double-faced pressure-sensitive adhesive tape is used for light reflecting. In this embodiment, the visible-light reflectance of the foam substrate is preferably 20% or more (from 20% to 100%), and more preferably 25% or more (from 25% to 100%), as with the visible-light transmittance of the entire double-faced pressure-sensitive adhesive tape.

The expansion ratio of the foam substrate is typically from 1.5 to 30 cc/g and preferably from 2.5 to 25.0 cc/g, from the standpoints of obtaining satisfactory sealability, cushioning properties, elasticity, processability, and waterproofness. As used herein the "expansion ratio" of a foam substrate is defined as the reciprocal of the apparent density of the foam substrate as measured according to the method described in JIS K 6767.

The elongation of the foam substrate is typically from 100% to 600% and preferably from 400% to 550% in machine direction (MD), and is typically from 100% to 500% and preferably from 150% to 450% in cross direction (CD), from the standpoints of obtaining satisfactory sealability, cushioning properties, elasticity, processability, and waterproofness. The "elongation" of a foam substrate is measured herein according to the method specified in JIS K 6767.

The tensile strength of the foam substrate is typically from 0.5 to 15 MPa and preferably from 1.0 to 10.0 MPa in machine direction and is typically from 0.5 to 13.0 MPa and preferably from 1.0 to 9.0 MPa in cross direction, from the standpoints of obtaining satisfactory sealability, cushioning properties, elasticity, processability, and waterproofness. The tensile strength of a foam substrate is measured herein according to the method specified in JIS K 6767.

The compressive hardness of the foam substrate is typically from 5 to 150 kPa and preferably from 12 to 120 kPa as measured by placing the substrate on a flat plate and compressing to 25% of the initial thickness. The range is preferred from the standpoints of obtaining satisfactory sealability, cushioning properties, elasticity, processability, and waterproofness. The compressive hardness of a foam substrate is measured herein according to the method specified in JIS K 6767.

For higher adhesion typically with the pressure-sensitive adhesive layers, the surfaces of the foam substrate may have undergone one or more common surface treatments. Exemplary surface treatments include corona treatment, chromate treatment, exposure to ozone, exposure to flame, exposure to a high-voltage electric shock, treatment with ionizing radiation, and other oxidizing treatments through a chemical or physical procedure. Alternatively or in addition, the surfaces may undergone a coating treatment typically with a primer or release agent.

The thickness of the foam substrate can be suitably set according typically to the strength and flexibility thereof, and the intended use of the double-faced pressure-sensitive adhesive tape, as long as the total thickness of the double-faced pressure-sensitive adhesive tape does not exceed 250 μm. The thickness is typically from about 50 to about 240 μm, preferably from about 80 to about 200 μm, and more preferably from about 100 to about 150 μm. The foam substrate, if having a thickness of less than 50 μm, may have through-holes and these may in turn cause some troubles. The foam substrate, if having a thickness of more than 240 μm, may impede the development of sufficient adhesive properties of the double-faced pressure-sensitive adhesive tape. The foam substrate may have a single-layer structure or multilayer structure.

Pressure-Sensitive Adhesive Layers

The pressure-sensitive adhesive layers (self-adhesive layers) are layers providing adhesive faces in the double-faced pressure-sensitive adhesive tape. Such pressure-sensitive adhesive layers mainly include known or common pressure-sensitive adhesives (tacky adhesives). Though not especially limited, exemplary pressure-sensitive adhesives for the pressure-sensitive adhesive layers include acrylic pressure-sensitive adhesives, rubber pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorinated pressure-sensitive adhesives, epoxy pressure-sensitive adhesives, and other known pressure-sensitive adhesives. Of these pressure-sensitive adhesives, acrylic pressure-sensitive adhesives are preferably employed. Each of different pressure-sensitive adhesives can be used alone or in combination. The type (form) of pressure-sensitive adhesives for use herein is not critical, and examples thereof include emulsion pressure-sensitive adhesives, solvent-borne pressure-sensitive adhesives, and thermofusible pressure-sensitive adhesives (hot-melt pressure-sensitive adhesives).

The acrylic pressure-sensitive adhesives can be pressure-sensitive adhesives each containing an acrylic polymer as a base polymer (base resin). Though not especially limited, the acrylic polymer can be prepared by subjecting to polymerization (or copolymerization) one or more alkyl (meth)acrylates as essential monomer components (main monomer components) and, where necessary, one or more monomers copolymerizable with the alkyl (meth)acrylates. Exemplary copolymerizable monomers include polar-group-containing monomers and multifunctional monomers. The polymerization can be performed, without limitation, according to any of known or common technique in the art, such as ultraviolet-ray (UV) polymerization, solution polymerization, or emulsion polymerization.

Alkyl (meth)acrylates for use as main monomer components of the acrylic polymer herein are alkyl (meth)acrylates each having a linear or branched-chain alkyl group, and examples thereof include alkyl (meth)acrylates whose alkyl moiety having 1 to 20 carbon atoms, such as methyl (meth)acrylates, ethyl (meth)acrylates, propyl (meth)acrylates, isopropyl (meth)acrylates, butyl (meth)acrylates, isobutyl (meth)acrylates, s-butyl (meth)acrylates, t-butyl (meth)acrylates, pentyl (meth)acrylates, isopentyl (meth)acrylates, hexyl (meth)acrylates, heptyl (meth)acrylates, octyl (meth)acrylates, 2-ethylhexyl (meth) acrylates, isooctyl (meth)acrylates, nonyl (meth)acrylates, isononyl (meth)acrylates, decyl (meth)acrylates, isodecyl (meth)acrylates, undecyl (meth)acrylates, dodecyl (meth) acrylates, tridecyl (meth) acrylates, tetradecyl (meth) acrylates, pentadecyl (meth) acrylates, hexadecyl (meth)acrylates, heptadecyl (meth) acrylates, octadecyl (meth)acrylates, nonadecyl (meth)acrylates, and eicosyl (meth)acrylates. Among them, alkyl (meth)acrylates whose alkyl moiety having 2 to 14 carbon atoms are preferred, and alkyl (meth)acrylates whose alkyl moiety having 2 to 10 carbon atoms are more preferred.

As being present as a main monomer component of the acrylic polymer, the amount of alkyl (meth)acrylates is, for example, desirably 60 percent by weight or more, and preferably 80 percent by weight or more, based on the total amount of monomer components for constituting the acrylic polymer.

The acrylic polymer may further contain, as monomer components, one or more copolymerizable monomers such as polar-group-containing monomers and multifunctional monomers. The presence of copolymerizable monomers as monomer components may help the pressure-sensitive adhesive to have an improved adhesive strength to an adherend and/or to have a higher cohesive strength. Each of different copolymerizable monomers can be used alone or in combination.

Exemplary polar-group-containing monomers include carboxyl-containing monomers such as (meth)acrylic acids, itaconic acid, maleic acid, fumaric acid, crotonic acid, and isocrotonic acid, as well as anhydrides of them, such as maleic anhydride; hydroxyl-containing monomers including hydroxyalkyl (meth)acrylates such as hydroxyethyl (meth) acrylates, hydroxypropyl (meth) acrylates, and hydroxybutyl (meth)acrylates; amido-containing monomers such as acrylamide, methacrylamide, N,N-dimethyl(meth)acrylamides, N-methylol(meth)acrylamides, N-methoxymethyl(meth) acrylamides, and N-butoxymethyl(meth)acrylamides; amino-containing monomers such as aminoethyl (meth)acrylates, dimethylaminoethyl (meth)acrylates, and t-butylaminoethyl (meth) acrylates; glycidyl-containing monomers such as glycidyl (meth)acrylates and methylglycidyl (meth) acrylates; cyano-containing monomers such as acrylonitrile and methacrylonitrile; heterocycle-containing vinyl monomers such as N-vinyl-2-pyrrolidone, (meth)acryloylmorpholines, N-vinylpyridine, N-vinylpiperidone, N-vinylpyrimidine, N-vinylpiperazine, N-vinylpyrrole, N-vinylimidazole, and N-vinyloxazole; alkoxyalkyl (meth)acrylate monomers such as methoxyethyl (meth)acrylates and ethoxyethyl (meth)acrylates; sulfo-containing monomers such as sodium vinylsulfonate; phosphate-containing monomers such as 2-hydroxyethylacryloyl phosphate; imido-containing monomers such as cyclohexylmaleimide and isopropylmaleimide; and isocyanate-containing monomers such as 2-methacryloyloxyethyl isocyanate. Of these polar-group-containing monomers, acrylic acid and other carboxyl-containing monomers, and anhydrides of them are preferred. The amount of polar-group-containing monomers is typically 30 percent by weight or less (e.g., from 0.1 to 30 percent by weight), and preferably from 0.1 to 15 percent by weight, based on the total amount of monomer components for constituting the acrylic polymer. Polar-group-containing monomers, if used in an amount of more than 30 percent by weight, may cause the acrylic pressure-sensitive adhesive to have an excessively high cohesive strength to thereby show insufficient tackiness. Polar-group-containing monomers, if used in an excessively small amount (e.g., less than 1 percent by weight based on the total amount of monomer components for constituting the acrylic polymer) may not satisfactorily help the acrylic pressure-sensitive adhesive to have a sufficient cohesive strength and to have a high shearing force.

Examples of the multifunctional monomers include hexanediol di(meth)acrylates, butanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri (meth)acrylates, dipentaerythritol hexa(meth)acrylates, trimethyloipropane tri(meth)acrylates, tetramethylolmethane tri (meth)acrylates, allyl (meth)acrylates, vinyl (meth)acrylates, divinylbenzene, epoxy acrylates, polyester acrylates, and urethane acrylates. The amount of multifunctional monomers is typically 2 percent by weight or less (e.g., from 0.01 to 2 percent by weight) and preferably 0.02 to 1 percent by weight, based on the total amount of monomer components for constituting the acrylic polymer. Multifunctional monomers, if used in an amount of more than 2 percent by weight of the total amount of monomer components for constituting the acrylic polymer, may cause the acrylic pressure-sensitive adhesive to have an excessively high cohesive strength, resulting in insufficient tackiness. Multifunctional monomers, if used in an excessively small amount (e.g., less than 0.01 percent by weight of the total amount of monomer components for constituting the acrylic polymer), may not satisfactorily help the acrylic pressure-sensitive adhesive to have a sufficient cohesive strength.

In addition to the polar-group-containing monomers and multifunctional monomers, exemplary copolymerizable monomers usable herein further include vinyl esters such as vinyl acetate and vinyl propionate; aromatic vinyl compounds such as styrene and vinyltoluene; olefins or dienes such as ethylene, butadiene, isoprene, and isobutylene; vinyl ethers such as vinyl alkyl ethers; and vinyl chloride. Exemplary copolymerizable monomers further include (meth) acrylates each having an alicyclic hydrocarbon group, such as cyclopentyl (meth)acrylates, cyclohexyl (meth)acrylates, and isobornyl (meth)acrylates.

The pressure-sensitive adhesive layers may contain suitable additives according to the intended use. Exemplary additives usable herein include crosslinking agents (e.g., polyisocyanate compounds, silicone compounds, epoxy compounds, and alkyl-etherified melamine compounds), tackifiers (e.g., tackifiers which typically include rosin derivative resins, polyterpene resins, petroleum resins, or oil-soluble phenolic resins and which are solid, semisolid or liquid at ordinary temperature), plasticizers, fillers, age inhibitors, antioxidants, and colorants (e.g., dyestuffs and pigments such as carbon blacks). Such additives may be chosen as appropriate according to the type of the pressure-sensitive adhesive.

A resin composition (pressure-sensitive, adhesive composition) for the formation of the pressure-sensitive adhesive layers can be prepared by mixing the base polymer, additives, and other components according to a known technique, which additives and other components may be incorporated according to the intended use.

Though not limited, the pressure-sensitive adhesive layers may be formed, for example, by applying the pressure-sensitive adhesive composition to a suitable support (carrier) such as a release liner or base material, to form the layers. Where necessary, any other process such as heating and/or drying may be conducted.

The total thickness of the pressure-sensitive adhesive layers (the total thickness of the pressure-sensitive adhesive layers arranged on or above both sides of the substrate) is generally from about 10 to about 200 µm, preferably from 30 to 170 µm, more preferably from 40 to 150 µm, and most preferably from 50 to 100 µm, though it may vary depending on the type of the pressure-sensitive adhesive layer and is not critical, as long as the total thickness of the double-faced pressure-sensitive adhesive tape does not exceed 250 µm. The pressure-sensitive adhesive layers, if present in a total thickness of less than 10 µm, may not ensure satisfactory adhesive properties. In contrast, the pressure-sensitive adhesive layers, if present in a total thickness of more than 200 µm, may not provide good processability. The respective thicknesses of the pressure-sensitive adhesive layers arranged on or above both sides of the substrate may be the same as or different from each other. Though not critical, the thickness of one pressure-sensitive adhesive layer is generally from 5 to 100 µm, preferably from 15 to 75 µm, and more preferably from 20 to 65 µm. Each of the pressure-sensitive adhesive layers may independently have a single-layer structure or multilayer structure.

Release Liners

The surfaces (adhesive faces) of the pressure-sensitive adhesive layers of the double-faced pressure-sensitive adhesive tape may be protected by a release liner (separator or release film) before use. In this case, the two adhesive faces of the double-faced pressure-sensitive adhesive tape may be protected by two release liners respectively; or the double-faced pressure-sensitive adhesive tape may be wound into a roll so that the two adhesive faces are protected by one release liner having release surfaces on both sides. The release liner(s) is used as a protective material for the pressure-sensitive adhesive layers and is removed on or before the application of the double-faced pressure-sensitive adhesive tape to the adherend. The thickness(es) of release liner(s), if used, is not included in the "total thickness of the double-faced pressure-sensitive adhesive tape".

Release liners for use herein can be, but not limited to, common release papers, and specific examples thereof include bases having a releasably treated layer; bases containing a fluorocarbon polymer and having low adhesiveness; and bases containing a non-polar polymer and having low adhesiveness. Exemplary bases having a releasably treated layer include plastic films and papers whose surface having been treated with a release agent. Exemplary release agents include silicone release agents, long-chain alkyl release agents, fluorine-containing release agents, and molybdenum sulfide release agents. Exemplary fluorocarbon polymers for constituting the bases containing a fluorocarbon polymer and having low adhesiveness include polytetrafluoroethylenes, polychlorotrifluoroethylenes, poly(vinyl fluoride)s, poly(vinylidene fluoride)s, tetrafluoroethylene-hexafluoropropylene copolymers, and chlorofluoroethylene-vinylidene fluoride copolymers. Exemplary non-polar polymers for constituting the bases containing a non-polar polymer and having low adhesiveness include olefinic resins such as polyethylenes and polypropylenes. The release liners can be formed according to a known or common procedure. The thicknesses and other dimensions or properties of the release liners are not critical.

Other Layers

In another embodiment, the double-faced pressure-sensitive adhesive tape includes one or more other layers (hereinafter also referred to as "additional layers") such as intermediate layers and undercoat layers, unless adversely affecting the advantages of the present invention. Typically, the double-faced pressure-sensitive adhesive tape may include one or more other layers between the foam substrate and the pressure-sensitive adhesive layer(s). In this case, the thickness(es) of the additional layer(s) is also included in the "total thickness of the double-faced pressure-sensitive adhesive tape", because the "total thickness of the double-faced pressure-sensitive adhesive tape" herein refers to the thickness from one adhesive face to the other adhesive face of the tape.

Double-Faced Pressure-Sensitive Adhesive Tapes

Double-faced pressure-sensitive adhesive tapes according to embodiments of the present invention are substrate-supported double-faced pressure-sensitive adhesive tapes which include a foam substrate, one pressure-sensitive adhesive layer arranged on or above one side of the substrate, and another pressure-sensitive adhesive layer arranged on or above the other side of the substrate and which have a total thickness (thickness from one adhesive face to the other adhesive face) of 250 μm or less. The double-faced pressure-sensitive adhesive tapes may each be a laminates of sheets or may be wound into a roll.

The double-faced pressure-sensitive adhesive tapes can be prepared according to a known or common procedure. Typically, a double-faced pressure-sensitive adhesive tape can be prepared by applying the pressure-sensitive adhesive composition to both sides of a foam substrate to form pressure-sensitive adhesive layers thereon. It can also be prepared by applying the pressure-sensitive adhesive composition to suitable carriers such as release liners or base materials to form pressure-sensitive adhesive layers respectively, and transferring the pressure-sensitive adhesive layers onto both sides of a foam substrate.

The total thickness of a double-faced pressure-sensitive adhesive tape is 250 μm or less (e.g., from 50 to 250 μm), preferably 200 μm or less (e.g., from 100 to 200 μm), and more preferably 150 μm or less (e.g., from 100 to 150 μm), from the standpoints of the reduction in thickness, size, and weight, as well as resource saving.

The double-faced pressure-sensitive adhesive tapes are thin and are highly waterproof (satisfactorily sealable against water). This is because the double-faced pressure-sensitive adhesive tapes include a foam substrate and have a total thickness of 250 (μm) or less.

In a preferred embodiment for exhibiting further satisfactory processability, the double-faced pressure-sensitive adhesive tape has a tensile strength of typically desirably from 0.5 to 20.0 MPa and preferably from 3.0 to 13.0 MPa, as measured according to JIS K 6767.

Such a tensile strength within the preferred range can be provided typically by controlling or modifying the thickness, type, and expansion ratio of the foam substrate, the thicknesses of the pressure-sensitive adhesive layers, and the types of the pressure-sensitive adhesives.

The double-faced pressure-sensitive adhesive tape according to the embodiment, having a tensile strength within the preferred range, can undergo processing such as cutting or punching further satisfactorily without difficulties and, when it is once peeled and then applied again, can be peeled off again without difficulties. The double-faced pressure-sensitive adhesive tape having a tensile strength within the specific range can undergo cutting or punching into special dimensions or complicated dimensions and advantageously used for the fixation of members, dust-proofing, waterproofing, and/or impact absorptivity.

In another preferred embodiment, the double-faced pressure-sensitive adhesive tape has an elongation of typically from 100% to 600% and preferably from 400% to 550% as measured according to the method specified in JIS K 6767. The range is preferred from the standpoints of obtaining satisfactory sealability, cushioning properties, elasticity, processability, and waterproofness.

The elongation according to JIS K 6767 is determined according to the following equation:

$$\text{Elongation}[\%]=[(\text{Gauge length at break})-(\text{Initial gauge length})]/(\text{Initial gauge length})\times 100$$

Such an elongation within the preferred range can be provided typically by controlling or modifying the thickness, type, and expansion ratio of the foam substrate, the thicknesses of the pressure-sensitive adhesive layers, and the types of the pressure-sensitive adhesives.

A compression load of the double-faced pressure-sensitive adhesive tape is not critical. For example, a compression load of the double-faced pressure-sensitive adhesive tape by 30% (a compression load by 30%) is preferably from 5 to 200 kPa, more preferably from 5 to 150 kPa, and furthermore preferably from 12 to 120 kPa. The compression load of the double-faced pressure-sensitive adhesive tape by 30% (compression load by 30%) is determined while compressing the double-faced pressure-sensitive adhesive tape by 30% of the initial thickness. The range is preferred from the standpoints of obtaining satisfactory sealability, cushioning properties, elasticity, processability, and waterproofness.

The compression load is determined according to the following equation:

$$\text{Compression load}=L/A$$

wherein "L" represents the load as measured by stacking ten plies of a sample double-faced pressure-sensitive adhesive tape to give an assembly, and compressing the assembly to a predetermined thickness with respect to the initial thickness of the assembly; and "A" represents the area of the sample double-faced pressure-sensitive adhesive tape.

The area of the double-faced pressure-sensitive adhesive tape may be set to 30 mm in width and 30 mm in length (i.e., 900 mm$^2$).

Such a compression load within the preferred range can be provided typically by controlling or modifying the thickness, type, and expansion ratio of the foam substrate, the thicknesses of the pressure-sensitive adhesive layers, and the types of the pressure-sensitive adhesives.

The double-faced pressure-sensitive adhesive tape, when having a compression load within the preferred range, can further satisfactorily fit uneven portions and thereby has further higher sealability.

Figure 2:
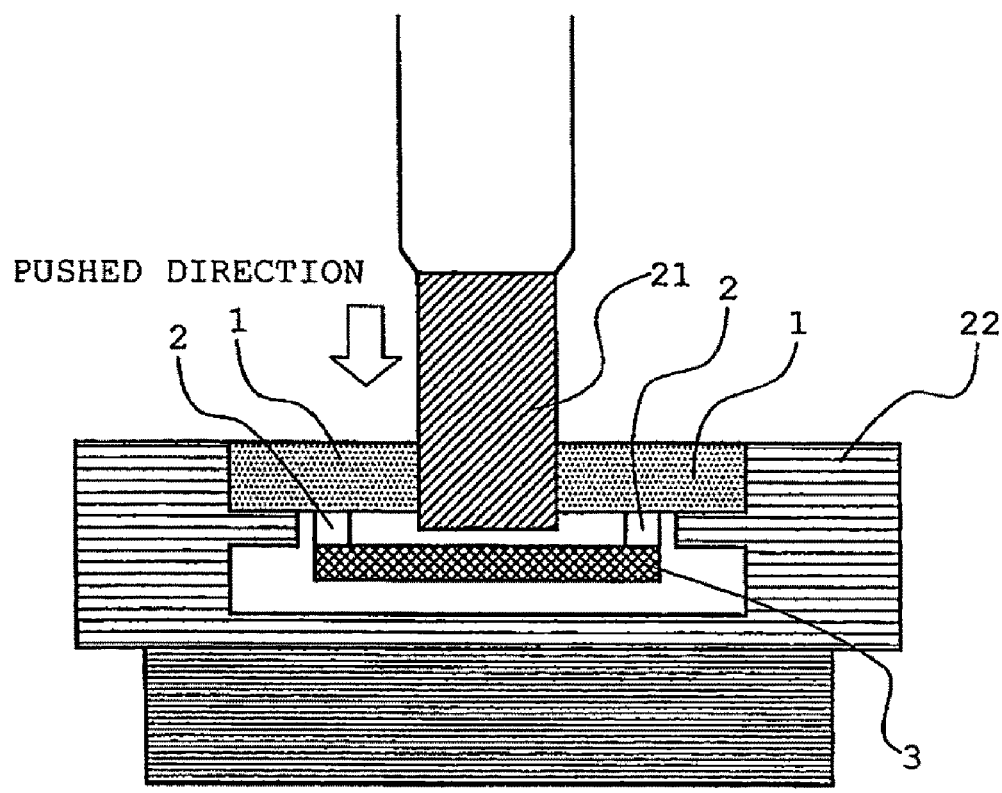
FIG. 2 is a schematic cross-sectional view illustrating how to measure the push out force.

In another preferred embodiment, the double-faced pressure-sensitive adhesive tape has a push out force of, for example, from 30 to 200 newtons (N), more preferably from 50 to 200 N, and furthermore preferably from 55 to 200 N, so as to prevent delamination of inner members due to stress. The push out force herein is measured as a bond strength by arranging a sample double-faced pressure-sensitive adhesive tape between a polycarbonate plate and an acrylic plate; affixing them through compression bonding under a compressive load applied by one reciprocating motion of a 2-kg roller; and measuring a bond strength while pushing pressing the acrylic plate as illustrated in FIG. 2.

Such a push out force within the preferred range can be provided typically by controlling or modifying the thickness, type, and expansion ratio of the foam substrate, the thicknesses of the pressure-sensitive adhesive layers, and the types of the pressure-sensitive adhesives.

The double-faced pressure-sensitive adhesive tapes according to embodiments of the present invention each use a foam substrate, thereby vary little in push out force even when affixed to adherends through compression bonding (contact bonding) under different loads, and ensure a satisfactory push out force even when affixed through compression bonding under a small load. Typically, they ensure a push out force of about 80% to 90% of such a push out force as to ensure 100% adhesion area, even when they are affixed to adherends through compression bonding under a small load of 500 grams.

The variation of push out force depending on the load during compression bonding can be adjusted typically by controlling or modifying the thickness, type, and expansion ratio of the foam substrate, the thicknesses of the pressure-sensitive adhesive layers, and the types of the pressure-sensitive adhesives.

The double-faced pressure-sensitive adhesive tapes therefore enable reliable adhesion and can be used with good workability. They are advantageously usable to such adherends that the application of the tapes through compression bonding under large loads is difficult. Examples of such adherends include fragile adherends, soft or flexible adherends, and adherends having non-flat (uneven) surfaces.

The push out force herein is determined in the following manner. A double-faced pressure-sensitive adhesive tape is shaped into a frame of 40 mm in outer width, 60 mm in outer length, and 1 mm in frame-width, and the frame-shaped adhesive tape is arranged between a polycarbonate plate and an acrylic plate and affixed to them through compression bonding under a predetermined load to give a test specimen. The acrylic plate in the test specimen is then pushed in a thickness direction of the acrylic plate from the inside toward the outside at a speed of 10 mm/minute, and the maximum stress until the acrylic plate is separated from the polycarbonate plate is measured and defined as the push out force.

The double-faced pressure-sensitive adhesive tapes according to embodiments of the present invention, as having a foam substrate, show satisfactory properties against dropping impact, and also for this reason, they ensure reliable adhesion. They show satisfactory properties against dropping impact even at low temperatures (e.g., about from −30 to 10° C.) and at high temperatures (e.g., about from 30 to 50° C.) because the foam substrate absorbs the impact and thereby relaxes the stress.

Though not critical, the impact absorptivity of a double-faced pressure-sensitive adhesive tape is preferably 5% or more, more preferably 7% or more, and furthermore preferably 10% or more. The range is preferred from the standpoints of obtaining satisfactory sealability, cushioning properties, elasticity, processability, and waterproofness. As used herein, the impact absorptivity of the double-faced pressure-sensitive adhesive tape is determined according to the following equation:

$$\text{Impact absorptivity}(\%) = (F0 - F1)/F0 \times 100$$

wherein F0 represents an impact force (blank) as measured without using a sample double-faced pressure-sensitive adhesive tape; and F1 represents an impact force as measured using the sample double-faced pressure-sensitive adhesive tape.

A higher impact absorptivity approaching 100% means that the double-faced pressure-sensitive adhesive tape absorbs the impact (shock) to a more extent.

According to a preferred embodiment, the double-faced pressure-sensitive adhesive tape has impact absorptivities defined by the above equation within the preferred range both under no compression (0% compression) and under compression in a thickness direction to a predetermined thickness with respect to the initial thickness. Typically, under such compression, the double-faced pressure-sensitive adhesive tape may be compressed in a thickness direction to 85% of the initial thickness (15% compression) or compressed in a thickness direction to 70% of the initial thickness (compression by 30%). The double-faced pressure-sensitive adhesive tape according to this embodiment can be applied to a variety of uses regardless of the magnitude of the gap (unevenness or roughness of the surface).

Such an impact absorptivity within the preferred range can be obtained typically by controlling or modifying the thickness, type, and expansion ratio of the foam substrate, the thicknesses of the pressure-sensitive adhesive layers, and the types of the pressure-sensitive adhesives.

Though not critical, the dust sealability of a double-faced pressure-sensitive adhesive tape is preferably 90% or more, more preferably 95% or more, and furthermore preferably 98% or more. The range is preferred from the standpoints of obtaining satisfactory sealability, cushioning properties, elasticity, processability, waterproofness, and dust-proofness. The dust sealability herein is defined according to the following equation:

$$\text{Dust sealability}(\%) = (P_0 - P_f)/P_0 \times 100$$

wherein $P_0$ represents the number of particles present in an exterior space (blank); and $P_f$ represents the number of particles passing through the double-faced pressure-sensitive adhesive tape.

Such dust sealability within the preferred range can be obtained typically by controlling or modifying the thickness, type, and expansion ratio of the foam substrate, the thicknesses of the pressure-sensitive adhesive layers, and the types of the pressure-sensitive adhesives.

The double-faced pressure-sensitive adhesive tape having a dust sealability within the preferred range is advantageously usable for the fixation of components of electronic appliances.

A double-faced pressure-sensitive adhesive tape according to a preferred embodiment is a halogen-free double-faced pressure-sensitive adhesive tape, because such halogen-free double-faced pressure-sensitive adhesive tape does not cause corrosion of metals and is advantageous when used for the fixation typically of electric/electronic components. The halogen-free double-faced pressure-sensitive adhesive tape according to this embodiment is not only thin and highly waterproof but also environmentally friendly. Typically, the double-faced pressure-sensitive adhesive tape emits little or substantially no toxic or corrosive gas upon combustion.

The halogen-free double-faced pressure-sensitive adhesive tape can be obtained, for example, by avoiding intentional use of halogen compounds as raw materials for the foam substrate and pressure-sensitive adhesives; by using a halogen-free foam substrate which intentionally contains no halogen compound; and/or by avoiding use of additives derived from halogen compounds. Two or more of techniques to obtain the halogen-free double-faced pressure-sensitive adhesive tape may be employed in combination.

A double-faced pressure-sensitive adhesive tape according to another preferred embodiment has a chlorine-containing gas emission of preferably 50 μg/g or less, more preferably 30 μg/g or less, and furthermore preferably 15 μg/g or less, as determined by the method mentioned below. As used herein, a "chlorine-containing gas" refers to a chlorine compound such as chlorine ($Cl_2$) or hydrogen chloride (HCl). The double-faced pressure-sensitive adhesive tape having a chlorine-containing gas emission of 50 μg/g or less more effectively avoids corrosion of metals and more advantageously usable for the fixation of electric/electronic components.

The double-faced pressure-sensitive adhesive tape having a chlorine-containing gas emission of 50 μg/g or less can be obtained according to any of the techniques to obtain the halogen-free double-faced pressure-sensitive adhesive tape.

The halogen gas emission can be determined in the following manner. A predetermined amount of a double-faced pressure-sensitive adhesive tape is weighed to give a sample; the sample is completely burnt according to a burnt gas sampling method; emitted gases are allowed to be absorbed by an absorbing liquid; and the amounts (μg/g) of chlorine ion, fluorine ion, bromine ion, and iodine ion in the absorbed liquid are quantitatively determined using an ion chromatograph.

Double-faced pressure-sensitive adhesive tapes according to other embodiments each include a colored foam substrate so as to control optical properties such as transmittance and reflectance.

Typically, a double-faced pressure-sensitive adhesive tape for light blocking use may include a foam substrate which has been colored black, so as to have a visible-light transmittance of preferably 15% or less (from 0% to 15%), and more preferably 10% or less (from 0% to 10%). A double-faced pressure-sensitive adhesive tape for light reflecting use may include a foam substrate which has been colored white, so as to have a visible-light reflectance of preferably 20% or more (from 20% to 100%), and more preferably 25% or more (from 25% to 100%). The visible-light transmittance and visible-light reflectance of the double-faced pressure-sensitive adhesive tapes are measured herein according to the methods mentioned later.

These double-faced pressure-sensitive adhesive tapes having controlled or modified optical properties can be used as or in optical components such as light diffusers, scattering element members (scatterers), and condensing members (condensators).

Though not critical, the lifting distance of a double-faced pressure-sensitive adhesive tape is, for example, desirably from 0 to 0.3 mm, and preferably from 0 to 0.1 mm so as to avoid delamination of inner members due to stress and so as not to adversely affect the sealability of the double-faced pressure-sensitive adhesive tape. The lifting distance herein is determined using a test specimen for the measurement of lifting distance mentioned later.

The lifting distance is determined using a sample (test specimen for lifting distance; see FIG. 4) which is prepared in the following manner. Specifically, a polycarbonate plate (10 mm in width, 30 mm in length, and 2 mm in thickness) and a poly(ethylene terephthalate) film (10 mm in width and 100 mm in length) are fixed so that one lengthwise end of the polycarbonate plate is aligned with one lengthwise end of the poly(ethylene terephthalate) film. A double-faced pressure-sensitive adhesive tape (10 mm in width and 3 mm in length) is affixed to the other lengthwise end portion of the poly(ethylene terephthalate) film on a side facing the polycarbonate plate so that the ends of the tape and film overlap one another. The poly(ethylene terephthalate) film (hereinafter also referred to as "polyester film") is then bent into a loop, and the double-faced pressure-sensitive adhesive tape thereon is affixed to the polycarbonate plate on a side thereof opposite to the side in contact with the polyester film at a position 10 mm inside from the end, and the resulting article is aged to give the test specimen.

Figure 5:
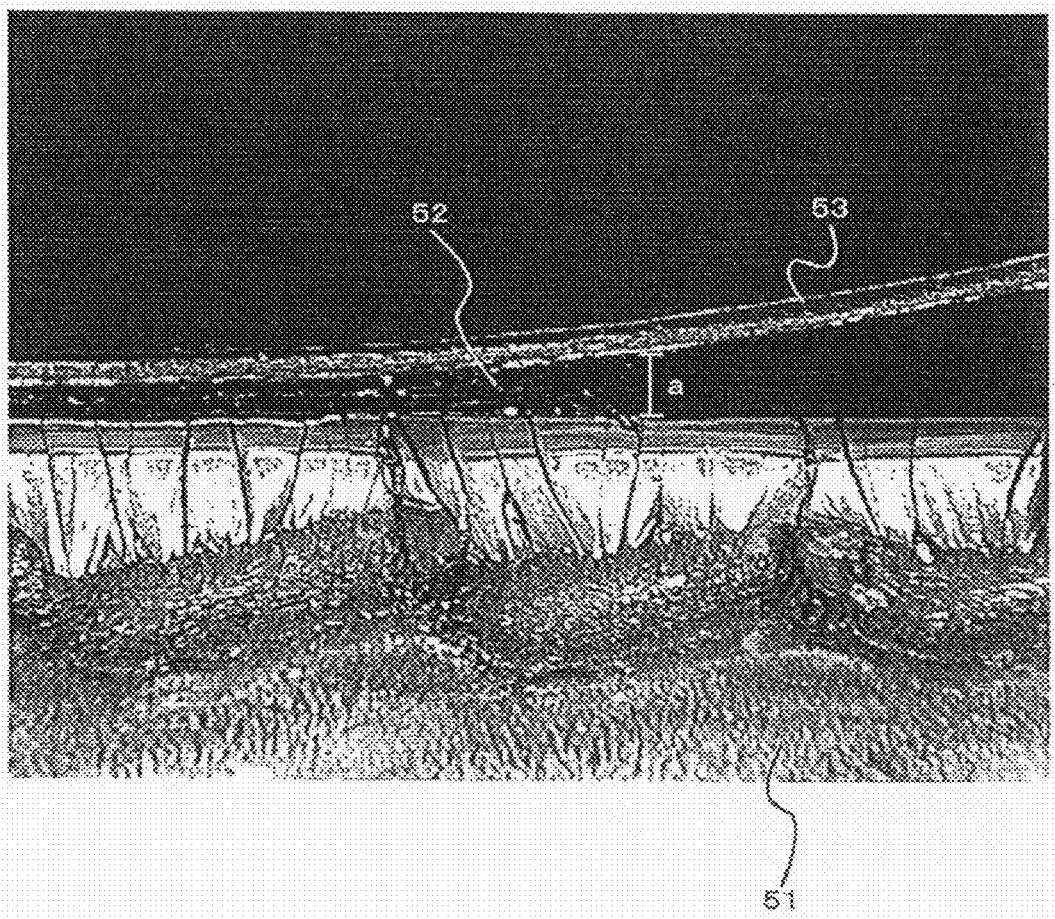
FIG. 5 is a micrograph illustrating how a lifting distance is determined in the testing of adhesion upon application of resistance to repulsion.

The lifting distance is determined in the following manner. Largest distances (corresponding to "a" in FIG. 5; "a" in FIG. 5 is 0.194 mm) between the surface of the polycarbonate plate and one adhesive face of the double-faced pressure-sensitive adhesive tape in contact with the polyester film are measured before and after aging on the test specimen for lifting distance, and the difference in largest distance "a" between before and after aging is defined as the lifting distance (lift height) herein.

Such a lifting distance within the preferred range can be obtained typically by controlling or modifying the thickness, type, and expansion ratio of the foam substrate, the thicknesses of the pressure-sensitive adhesive layers, and the types of the pressure-sensitive adhesives.

The double-faced pressure-sensitive adhesive tape according to this embodiment having such a lifting distance within the preferred range can develop a satisfactory bond strength even upon application of repulsive force. With a decreasing lifting distance, the double-faced pressure-sensitive adhesive tape can exhibit a more satisfactory adhesion upon application of repulsive force. Typically, when a main panel of a cellular phone is affixed by a double-faced pressure-sensitive adhesive tape, the lifting-off may occur to cause troubles, due typically to stress from inner members, deterioration of the double-faced pressure-sensitive adhesive tape with time, and/or the uneven face or curved face of the adherend main panel. The double-faced pressure-sensitive adhesive tape according to this embodiment is advantageously usable to adherends having an uneven face and/or curved face with less causing lifting-off.

As has been described, double-faced pressure-sensitive adhesive tapes according to embodiments of the present invention can excel in various properties such as cutting (punching) processability, removability after re-affixation, fittability to uneven or bumped portions, sealability, sealability against water, lifting-off prevention (split prevention), adhesion reliability, workability, optical functions, and adhesion upon application of repulsive force. The double-faced pressure-sensitive adhesive tapes are therefore very useful typically for the fixation of lenses in cellular phones, for the fixation of key module members in cellular phones, as shock absorbers for electronic appliances, for the fixation of decorative panels in television systems, for the protection of battery packs in personal computers, and for the waterproofing of lenses in digital video cameras.

A double-faced pressure-sensitive adhesive tape in another embodiment is used in optical components. More specifically, it is used for the affixation of optical components and for the production of optical products.

As used herein an "optical component" refers to a member having any of optical properties such as polarizability, photorefractivity, light scattering, light reflectivity, optical transparency, optical absorptivity, optical diffractive ability, optical rotatory power, and visibility. Optical components herein are not limited, as long as being members having any of optical properties, and examples thereof include members constituting, or being used in, appliances (optical appliances) such as display devices (image display devices) and input devices. Specifically, exemplary optical components include polarizing plates, wave plates, retardation films (phase difference films), compensation films, brightness enhancing films, light-guiding panels, reflective films, antireflective films, transparent electroconductive films (e.g., indium-tin-oxide (ITO) films), films with attractive appearance, decorative films, surface-protective films, prisms, lenses, color filters, and transparent substrates; and laminates of these members. As used herein, the "plates (or panels)" and "films" also include articles in forms such as plates, films, and sheets, respectively. Typically, the "polarizing plates" also include "polarizing films" and "polarizing sheets".

Examples of the display devices include liquid crystal display devices, organic electroluminescent (organic EL) display devices, plasma display panels (PDPs), and electronic papers. Exemplary input devices include touch panels.

EXAMPLES

The present invention will be illustrated in further detail, with reference to several examples and comparative examples below. It should be noted, however, these examples are never construed to limit the scope of the present invention.

Example 1

A solution of an acrylic polymer was prepared by placing 69 parts by weight of toluene and 163 parts by weight of ethyl acetate as solvents, as well as 80 parts by weight of butyl acrylate, 20 parts by weight of 2-ethylhexyl acrylate, 3 parts by weight of acrylic acid, 5 parts by weight of vinyl acetate, 0.1 part by weight of 2-hydroxyethyl acrylate, and, as an initiator, 0.2 part by weight of 2,2-azobisisobutyronitrile in a reactor equipped with a condenser tube, nitrogen inlet tube, thermometer, dropping funnel, and stirrer; and subjecting the mixture to polymerization at 60° C. in a nitrogen stream for 6 hours.

The above-prepared solution was combined with 30 parts by weight of a polymerized rosin ester resin and 1.5 parts by weight (in terms of solids content) of an isocyanate crosslinking agent (trade name "CORONATE L" supplied by Nippon Polyurethane Industry Co., Ltd.), each per 100 parts by weight of the polymer component in the solution, and thereby yielded an acrylic pressure-sensitive adhesive composition.

The prepared acrylic pressure-sensitive adhesive composition was applied to a release paper 135 μm thick using a bar coater and dried at 110° C. for 3 minutes to form a pressure-sensitive adhesive layer 25 μm thick thereon. The release paper had been treated with a silicone.

A black polyethylene foam substrate was affixed directly to the pressure-sensitive adhesive layer on the release liner and thereby yielded a single-faced pressure-sensitive adhesive tape having a layer structure of (release liner)/(pressure-sensitive adhesive layer)/(foam substrate). The black polyethylene foam substrate was a product supplied by Sekisui Chemical Co., Ltd. under the trade name "Volara XL-HN #03001W Black", having a thickness of 0.10 mm, an expansion ratio of 2.9 cc/g, elongation percentages of 480% (machine direction) and 195% (cross direction), tensile strengths of 9.5 MPa (machine direction) and 8.7 MPa (cross direction), and a compressive hardness of 64 kPa (25% compression).

Next, another portion of the acrylic pressure-sensitive adhesive composition was applied to a process release liner using a bar coater and was dried at 110° C. for 3 minutes to form a pressure-sensitive adhesive layer 25 μm thick thereon.

The pressure-sensitive adhesive layer on the process release liner was directly affixed to the foam substrate of the single-faced pressure-sensitive adhesive tape having the layer structure of (release liner)/(pressure-sensitive adhesive layer)/(foam substrate), from which the process release liner was removed, to yield a double-faced pressure-sensitive adhesive tape having a layer structure of (release liner)/(pressure-sensitive adhesive layer)/(foam substrate)/(pressure-sensitive adhesive layer).

Example 2

A double-faced pressure-sensitive adhesive tape was prepared by the procedure of Example 1, except for using a white polyethylene foam substrate instead of the black polyethylene foam substrate. The white polyethylene foam substrate was a product supplied by Sekisui Chemical Co., Ltd. under the trade name "Volara XL-HN #03001W White", having a thickness of 0.10 mm, an expansion ratio of 3.1 cc/g, elongation percentages of 497% (machine direction) and 184% (cross direction), tensile strengths of 9.4 MPa (machine direction) and 8.4 MPa (cross direction), and a compressive hardness of 64 kPa (25% compression).

Example 3

A double-faced pressure-sensitive adhesive tape was prepared by the procedure of Example 1, except for forming a pressure-sensitive adhesive layer 50 μm thick on the release liner, and forming another pressure-sensitive adhesive layer 50 μm thick on the process release liner.

Example 4

A double-faced pressure-sensitive adhesive tape was prepared by the procedure of Example 2, except for forming a pressure-sensitive adhesive layer 50 μm thick on the release liner, and forming another pressure-sensitive adhesive layer 50 μm thick on the process release liner.

Comparative Example 1

A substrate-supported double-faced pressure-sensitive adhesive tape (trade name "No. 5637" supplied by Nitto Denko Corporation) was used as a double-faced pressure-sensitive adhesive tape. This included a PET #12 substrate, an acrylic pressure-sensitive adhesive layer arranged on one side of the substrate, and another acrylic pressure-sensitive adhesive layer arranged on the other side and had a total thickness from one adhesive face to the other adhesive face of 0.10 mm.

Comparative Example 2

A substrate-supported double-faced pressure-sensitive adhesive tape (trade name "No. 5100" supplied by Nitto Denko Corporation) was used as a double-faced pressure-sensitive adhesive tape. This included a nonwoven fabric substrate, an acrylic pressure-sensitive adhesive layer arranged on one side of the substrate, and another acrylic pressure-sensitive adhesive layer arranged on the other side and had a total thickness from one adhesive face to the other adhesive face of 0.20 mm.

Comparative Example 3

A substrate-supported double-faced pressure-sensitive adhesive tape (trade name "KF-5713" supplied by Nitto Denko Corporation) was used as a double-faced pressure-sensitive adhesive tape. This included a foam substrate, an acrylic pressure-sensitive adhesive layer arranged on one side of the substrate, and another pressure-sensitive adhesive layer arranged on the other side, and had a total thickness from one adhesive face to the other adhesive face of 0.33 mm.

Tests

The double-faced pressure-sensitive adhesive tapes according to the examples and comparative examples were each subjected to measurements or determinations of 180-degree peel strength, push out force, drop impact resistance, adhesion upon application of repulsive force, optical properties, waterproofness, tensile strength, elongation, compression load, halogen emission, impact absorptivity, and dust sealability.

180-Degree Peel Strength

A series of test specimens was prepared by cutting each pressure-sensitive adhesive tape to a piece 20 mm in width and 100 mm in length, and affixing a poly(ethylene terephthalate) film (polyester film 25 μm thick) to one of the pressure-sensitive adhesive layers of the cut pressure-sensitive adhesive tape.

After removing the release liner therefrom to expose an adhesive face to be tested, the test specimens were affixed to a stainless steel (SUS) plate through contact bonding with one reciprocating movement of a 2-kg roller, and left stand at an ambient temperature of 23° C. and relative humidity of 50% for 30 minutes.

After being left stand, a 180-degree peel strength (peel adhesive strength) of the test specimens was measured by peeling at a tensile speed of 300 mm/minute and a peel angle of 180 degrees using a universal tensile and compression testing machine (trade name "Tensile and Compression Testing Machine, TG-1kN" supplied by Minebea Co., Ltd.). The measurements were performed at an ambient temperature of 23° C. and relative humidity of 50%. The measured data are shown in Table 1 below.

TABLE 1

|  | 180-Degree Peel Strength [N/20 mm] |
| --- | --- |
| Example 1 | 15.0 |
| Example 2 | 15.0 |
| Example 3 | 17.0 |
| Example 4 | 17.0 |
| Comparative Example 1 | 16.6 |
| Comparative Example 2 | 14.0 |

Push Out Force

A series of frame-shaped double-faced pressure-sensitive adhesive tapes of 40 mm in outer width, 60 mm in outer length, and 1 mm in frame-width as shown in FIG. 1A was prepared by cutting the above-prepared pressure-sensitive adhesive tapes.

Figure 1B:
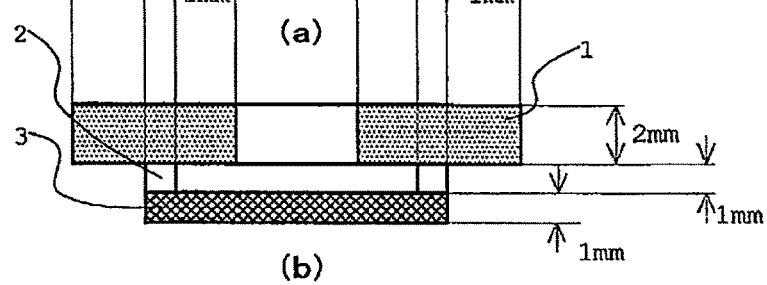

An acrylic plate (acrylic lens; 40 mm in width, 60 mm in length, and 1 mm in thickness) and a polycarbonate plate (PC plate) (70 mm in width, 80 mm in length, and 2 mm in thickness) having a through hole of 15 mm in diameter at the center part thereof were affixed via each of the frame-shaped double-faced pressure-sensitive adhesive tapes through compression bonding with one reciprocating movement of a roller under a predetermined compression bonding load (1 kg, 2 kg, 3 kg, 4 kg, or 5 kg) to give test specimens including a test specimen compressed and bonded under 1-kg load (1-kg test specimen), 2-kg test specimen, 3-kg test specimen, 4-kg test specimen, and 5-kg test specimen (FIGS. 1A and 1B).

Independently, a test specimen after compression bonding with one reciprocating movement of a 5-kg roller (5-kg test specimen) was placed in an autoclave and subjected to further compression bonding at a temperature of 50° C. and a pressure of 5 atmospheres for 1 hour to give a test specimen (autoclaved test specimen). The autoclaved test specimen is assumed to have an adhesion area of the frame-shaped double-faced pressure-sensitive adhesive tape of 100%.

FIGS. 1A and 1B are a schematic top view and a schematic cross-sectional view along the lines A-A', respectively, of a test specimen used in the measurement of the push out force. In FIGS. 1A and 1B, reference numerals "1" stands for a polycarbonate plate, "2" stands for a frame-shaped double-faced pressure-sensitive adhesive tape, "3" stands for an acrylic plate, and "4" stands for a through hole of the polycarbonate plate.

Next, the test specimens were mounted to a universal tensile and compression testing machine (trade name "Tensile and Compression Testing Machine, TG-1kN" supplied by Minebea Co., Ltd.), a round bar was allowed to pass through the through-hole of the polycarbonate plate, the acrylic plate, was pressed by the round bar at a rate of 10 mm/minute, and a largest stress until the acrylic plate was separated from the polycarbonate plate was measured as a push out force (FIG. 2). The measurements were performed at room temperature. The measured data are shown in Table 2 below.

FIG. 2 is a schematic cross-sectional view illustrating how to measure the push out force. In FIG. 2, the reference numerals "1" stands for the polycarbonate plate, "2" stands for the frame-shaped double-faced pressure-sensitive adhesive tape, "3" stands for the acrylic plate, "21" stands for the round bar, and "22" stands for a support. A test specimen was fixed in the support 22 of the tensile and compression testing machine as illustrated in FIG. 2, and the acrylic plate 3 of the test specimen was pressed or pushed by the round bar 21 which had passed through the through-hole of the polycarbonate plate 1. Upon the pressing of the acrylic plate, the polycarbonate plate 1 in the test specimen did not suffer from warpage and breakage due to load applied thereon.

TABLE 2

|  | Push out force [N] | | | | | |
| --- | --- | --- | --- | --- | --- | --- |
|  | 1-kg Test specimen | 2-kg Test specimen | 3-kg Test specimen | 4-kg Test specimen | 5-kg Test specimen | Autoclaved test specimen |
| Example 1 | 60 | 64 | 68 | 70 | 70 | 80 |
| Example 2 | 58 | 60 | 62 | 63 | 63 | 68 |
| Example 3 | 55 | 58 | 60 | 60 | 61 | 64 |
| Example 4 | 51 | 54 | 54 | 55 | 55 | 58 |
| Comparative Example 1 | 53 | 56 | 65 | 76 | 76 | 90 |

The samples according to Examples 1 to 4 show small variations in push out force depending on compression bonding load; but, in contrast, the sample according to the comparative example (Comparative Example 1) shows a large variation in push out force depending on compression bonding load. The samples according to Examples 1 to 4 each have a foam substrate and thereby develop satisfactory bond strengths through compression bonding even under a small load, as compared to the sample according to Comparative Example 1 using a poly(ethylene terephthalate) substrate.

Drop Impact Resistance

A series of frame-shaped (trim-form) double-faced pressure-sensitive adhesive tapes 40 mm in outer width, 60 mm in outer length, and 1 mm in frame-width as shown in FIG. 3A was prepared by cutting the above-prepared pressure-sensitive adhesive tapes.

An acrylic plate (acrylic lens; 40 mm in width, 60 mm in length, and 1 mm in thickness) and a polycarbonate plate (PC plate) (70 mm in width, 80 mm in length, and 2 mm in thickness) were affixed via each of the frame-shaped double-faced pressure-sensitive adhesive tapes through compression bonding with one reciprocating movement of a 2-kg roller and thereby yielded test specimens (see FIGS. 3A and 3B).

Next, the test specimens were each adjusted to have a total weight of 110 g with a weight attached on it, and then allowed to fall freely from a height of 1.2 meters to a concrete plate to determine the drop impact resistance of the test specimens. The drop impact resistance was determined by allowing each test specimen to fall freely at room temperature (about 23° C.) 18 times. Of the test specimens after 18-time free falls at room temperature, those holding the acrylic plate during the 18-time free falls were further allowed to fall freely 60 times at low temperatures (about −5° C.).

Criteria:

Good: The sample held the acrylic plate without delamination both during 18-time free falls at room temperature and during 60-time free falls at low temperatures;

Poor: The sample suffered from delamination of the acrylic plate during free falls at room temperature, or the sample held the acrylic plate without delamination during free falls at room temperature but suffered from delamination of the acrylic plate during free falls at low temperatures FIGS. 3A and 3B are a schematic top view and a schematic cross-sectional view along the lines B-B', respectively, of a test specimen for the measurement of drop impact resistance. In FIGS. 3A and 3B, the reference numerals "31" stands for the polycarbonate plate, "32" stands for the frame-shaped double-faced pressure-sensitive adhesive tape, and "33" stands for the acrylic plate (acrylic lens).

TABLE 3

|  | Drop impact resistance | |
|---|---|---|
|  | Room temperature | Low temperature |
| Example 1 | Good | Good |
| Example 2 | Good | Good |
| Example 3 | Good | Good |
| Example 4 | Good | Good |
| Comparative Example 1 | Good | Poor (1) |

In Table 3, a number in the parentheses after the term "Poor" refers to the number of free falls at which the delamination of the acrylic plate occurred. Typically, "Poor (1)" means that the delamination of the acrylic plate occurred at the first free fall and the sample was evaluated as having poor drop impact resistance.

The samples according to Examples 1 to 4 each including a foam substrate show very superior dropping impact resistance to the sample according to Comparative Example 1, as the samples according to Examples 1 to 4 have the same composition of pressure-sensitive adhesive as that of the sample according to Comparative Example 1.

Resistance To Repulsion

Figure 4:
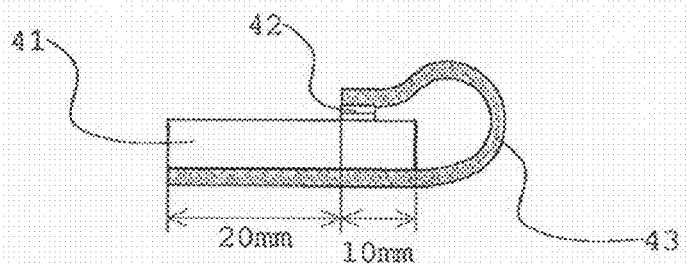
FIG. 4 is a schematic cross-sectional view of a test specimen for use in the testing of adhesion upon application of resistance to repulsion.

The double-faced pressure-sensitive adhesive tapes prepared according to Examples 1 to 4 and Comparative Example 1 were cut to pieces 10 mm in width and 3 mm in length. A series of test specimens as illustrated in FIGS. 4 and 5 was prepared by using a polycarbonate plate (10 mm in width, 30 mm in length, and 2 mm in thickness), each of the cut pieces, and a poly(ethylene terephthalate) film ("PET #100"; 10 mm in width and 100 mm in length).

The test specimens were aged at 23° C. for 24 hours, followed by further aging at 80° C. for 24 hours.

Before and after aging, largest distances (corresponding to "a" in FIG. 5) between the surface of the polycarbonate plate and one adhesive face of the double-faced pressure-sensitive adhesive tape in contact with the polyester film were measured using a digital microscope (trade name "VH-500" supplied by Keyence Corporation), and the difference in largest distance "a" between before and after aging was defined as the lifting distance (lift height).

With a decreasing "lifting distance", a sample is evaluated to have better adhesion upon application of repulsive force.

FIG. 4 is a schematic cross-sectional view of a test specimen used in testing for resistance to repulsion. In FIG. 4, the reference numerals "41" stands for the polycarbonate plate, "42" stands for the double-faced pressure-sensitive adhesive tape, and "43" stands for the poly(ethylene terephthalate) film. In FIG. 5, the reference numerals "51" stands for the polycarbonate plate, "52" stands for the double-faced pressure-sensitive adhesive tape, 53" stands for the polyester film, "a" stands for the largest distance (index for the lifting distance (lift height)) between the surface of the polycarbonate plate and one adhesive face of the double-faced pressure-sensitive adhesive tape in contact with the polyester film.

TABLE 4

|  | Lifting distance [mm] |
|---|---|
| Example 1 | 0.035 |
| Example 2 | 0.036 |
| Example 3 | 0.049 |
| Example 4 | 0.050 |
| Comparative Example 1 | 0.102 |

Optical Properties

The visible-light transmittance was determined by applying light at a wavelength of 550 nm to one side of a double-faced pressure-sensitive adhesive tape and measuring the intensity of light passing through the tape to the other side using a spectrophotometer (trade name "Model U-4100 Spectrophotometer" supplied by Hitachi High-Technologies Corporation).

The visible-light reflectance was determined by applying light at a wavelength of 550 nm to one side of a double-faced pressure-sensitive adhesive tape and measuring the intensity of light reflected at the one side using a spectrophotometer (trade name "Model U-4100 Spectrophotometer" supplied by Hitachi High-Technologies Corporation).

The measurements were performed after removing the release liners from the tapes.

TABLE 5

|  | Visible-light transmittance (%) | Visible-light reflectance (%) |
|---|---|---|
| Example 1 | 6.07 | — |
| Example 2 | — | 27.98 |
| Example 3 | 5.44 | — |
| Example 4 | — | 28.98 |

In Table 5, the symbol "—" means that the measurement was not performed.

Waterproofness

A series of frame-shaped double-faced pressure-sensitive adhesive tapes (60 mm in outer width, 40 mm in outer length, and 1 mm in frame-width) was prepared by cutting the pressure-sensitive adhesive tapes prepared according to Examples 1 to 4 and Comparative Examples 1 and 2.

Next, each of the frame-shaped double-faced pressure-sensitive adhesive tapes was applied to four acrylic plates (acrylic lenses, 60 mm in width, 40 mm in length, and 1 mm in thickness), respectively. Independently, two bump tapes (5 mm in width) were applied to a polycarbonate plate (PC plate). The four acrylic plates each bearing the frame-shaped double-faced pressure-sensitive adhesive tape were affixed to the polycarbonate plate bearing the bump tape through compression bonding with one reciprocating movement of a 2-kg roller, so that the frame-shaped double-faced pressure-sensitive adhesive tape faced the bump tape. Thus, a series of test specimens having gaps corresponding to the thicknesses of the bump tapes (bump heights; 10 μm, 20 μm, 30 μm, 50 μm, 70 μm, and 100 μm) were prepared (FIGS. 6A and 6B).

The bump tapes were applied to the polycarbonate plate so as to form uneven portions thereon, and pairs of bump tapes having thicknesses (corresponding to bump heights) of 10 μm, 20 μm, 30 μm, 50 μm, 70 μm, and 100 μm, respectively, were used (FIGS. 6A and 6B).

Independently, a series of test specimens having a bump height of 0 μm without gap was prepared by the procedure as above, except for affixing the four acrylic plates bearing the frame-shaped double-faced pressure-sensitive adhesive tapes to a polycarbonate plate bearing no bump tape and having a smooth surface through compression bonding with one reciprocating movement of a 2-kg roller.

In these procedures, eight plies of a nonwoven fabric (each 20 mm in width, 30 mm in length, and 0.05 mm in thickness) per one test specimen were placed between the acrylic plate and polycarbonate plate. The nonwoven fabric, if absorbing water, changes in color and was thereby used to determine whether water entered inside of the test specimen. The nonwoven fabric does not influence the tests for the waterproofness.

The waterproof tests were performed on the test specimens having different bump heights (corresponding to the thicknesses of the bump tape) according to IPX7 standard (Japanese Industrial Standards (JIS) C 0920/International Electrotechnical Commission (IEC) standard 60529). Specifically, each test specimen was submerged 1 meter deep in a water tank under standard conditions of a temperature of 23° C. and humidity of 50% for 30 minutes, and whether water entered the inside of the test specimen was observed.

The waterproofness tests were conducted after aging the test specimens having different bump heights under standard conditions of a temperature of 23° C. and humidity of 50% for 30 minutes.

For each bump height, two test specimens each bearing four acrylic plates were prepared (FIGS. 6A and 6B), and a total of eight samples per bump height were visually observed whether water entered the inside of the sample. In this connection, one sample herein included one acrylic plate and had one space surrounded by the double-faced pressure-sensitive adhesive tape, and the nonwoven fabric was placed in the space. The results are shown in Table 6. Numerical values indicated as data in Table 6 are numbers of samples showing no water immersion to the inside space and being evaluated as having "good waterproofness".

Typically, when indicated as "8", it means that all the eight samples were evaluated as having good waterproofness. Likewise, when indicated as "7", seven samples out of the eight samples were evaluated as having good waterproofness. When indicated as "0", all the eight samples suffered from water immersion into the inside space.

FIGS. 6A and 6B are a schematic top view and a schematic cross-sectional view along the lines C-C', respectively, of a test specimen used in the testing of waterproofness. In FIG. 6, the reference numerals "61" stands for the polycarbonate plate, "62" stands for the bump tape, "63" stands for the frame-shaped double-faced pressure-sensitive adhesive tape, "64" stands for the acrylic plate (acrylic lens), and "65" stands for the nonwoven fabric.

TABLE 6

| | Total thickness | Bump height (difference in level) [μm] | | | | | | |
|---|---|---|---|---|---|---|---|---|
| | [μm] | 0 | 10 | 20 | 30 | 50 | 70 | 100 |
| Example 1 | 150 | 8 | 8 | 8 | 8 | 7 | 0 | 0 |
| Example 2 | 150 | 8 | 8 | 8 | 8 | 7 | 0 | 0 |
| Example 3 | 200 | 8 | 8 | 8 | 8 | 8 | 0 | 0 |
| Example 4 | 200 | 8 | 8 | 8 | 8 | 8 | 0 | 0 |
| Comparative Example 1 | 100 | 8 | 8 | 0 | 0 | 0 | 0 | 0 |
| Comparative Example 2 | 200 | 0 | 0 | 0 | 0 | 0 | 0 | 0 |

The double-faced pressure-sensitive adhesive tapes according to Examples 1 to 4 showed superior waterproofness to the double-faced pressure-sensitive adhesive tapes according to Comparative Examples 1 and 2. This is probably because the double-faced pressure-sensitive adhesive tapes according to Examples 1 to 4 each have a foam substrate and thereby more satisfactorily fit uneven or bumped surfaces of adherends.

Tensile Strength and Elongation

The tensile strength of a sample double-faced pressure-sensitive adhesive tape was evaluated by measuring a tensile strength and an elongation according to the method specified in JIS K 6767.

Specifically, the double-faced pressure-sensitive adhesive tapes were cut into dumbbell #1 test pieces, and the test pieces were marked with gauge marks at intervals of 40 mm at the center of the parallel portion.

The test pieces with gauge marks were attached to upper and lower chucks of a universal tensile and compression testing machine (the Tensile and Compression Testing Machine "TG-1kN" (trade name) supplied by Minebea Co., Ltd.) in such precise manner as to avoid strain or deformation during measurement. The test pieces were then pulled at a tensile speed of 500 mm/minute, and a maximum load (stress at break) and a gauge length during pulling were measured.

The tensile strength and elongation were determined based on the maximum load and gauge length according to the following equations:

$$\text{Tensile strength[MPa]} = (\text{Maximum load})/(\text{Cross-sectional area of test piece})$$

$$\text{Elongation[\%]} = [(\text{Gauge length at break}) - (\text{Initial gauge length})]/(\text{Initial gauge length}) \times 100$$

TABLE 7

| | Total thickness [μm] | Tensile strength [MPa] | Elongation [%] |
|---|---|---|---|
| Example 1 | 150 | 6.8 | 522 |
| Example 2 | 150 | 5.4 | 470 |
| Example 3 | 200 | 5.0 | 504 |
| Example 4 | 200 | 4.5 | 478 |

Compression Load

A series of test pieces of 30 mm in length and 30 mm in width was prepared by stacking ten plies of each double-faced pressure-sensitive adhesive tape to give laminates and cutting the laminates.

The test pieces were placed between flat, parallel plates of a universal tensile and compression testing machine (Tensile and Compression Testing Machine "TG-1kN" (trade name) supplied by Minebea Co., Ltd.), compressed at a rate of 10 mm/minute by 10%, 20%, 30%, 40%, and 50% of the initial thickness, loads required for the compression were measured, and loads upon compressing by different compression percentages were determined according to the following equation:

Compression load[kPa]=(compression load at a certain compression percentage)/(Area of test piece)

TABLE 8

|  | Total thickness [μm] | Compression load [kPa] | | | |
| --- | --- | --- | --- | --- | --- |
|  |  | Compression by 10% | Compression by 20% | Compression by 30% | Compression by 40% |
| Example 1 | 150 | 0.6 | 19.9 | 31.1 | 135.1 |
| Example 2 | 150 | 0.4 | 9.9 | 31.1 | 74.8 |
| Example 3 | 200 | 1.1 | 51.7 | 98.5 | overload |
| Example 4 | 200 | 0.7 | 35 | 100.9 | overload |
| Comparative Example 1 | 100 | 199.5 | overload | overload | overload |

The term "overload" in Table 8 means that the load exceeded the measurable upper limit of a load cell of the tensile and compression testing machine. Table 8 demonstrates that the double-faced pressure-sensitive adhesive tapes according to Examples 1 to 4 are more flexible.

Halogen Emission

The double-faced pressure-sensitive adhesive tapes according to Examples 1 to 4 and Comparative Example 3 from which the release liners had been removed were used as test specimens herein.

Each 30 mg of the test specimens was weighed, subjected to complete combustion according to a burnt gas sampling method using the automated combustion system "AQF-100" (trade name) supplied by Mitsubishi Chemical Analytech Co., Ltd., and emitted gas was absorbed by an aqueous solution containing 30 ppm of $H_2O_2$ and 3 ppm of methanesulfonic acid.

The aqueous solution after absorption (250 μL) was injected into the ion chromatograph Anion DIONEX, DX-320 (trade name; supplied by DIONEX CORPORATION), and the amounts (μg/g) of chlorine ion, fluorine ion, bromine ion, and iodine ion were measured.

The results are shown in Table 9. In Table 9, the symbol "<3" means that the amount was below the quantitative lower limit of the ion chromatograph, i.e., 3 μg/g.

Impact Absorptivity

The double-faced pressure-sensitive adhesive tapes according to Examples 1 to 4 were cut, from which the release liner was removed, and thereby yielded test specimens 20 mm in width and 20 mm in length (20-mm square). The double-faced pressure-sensitive adhesive tapes had a layer structure of (release liner)/(pressure-sensitive adhesive layer)/(foam substrate)/(pressure-sensitive adhesive layer). Likewise, the double-faced pressure-sensitive adhesive tape according to Comparative Example 3 was cut, from which the release liner was removed, and thereby yielded a test specimen 20 mm in width and 20 mm in length (20-mm square). These test specimens each correspond to a test specimen 72 in FIG. 7.

Figure 7:
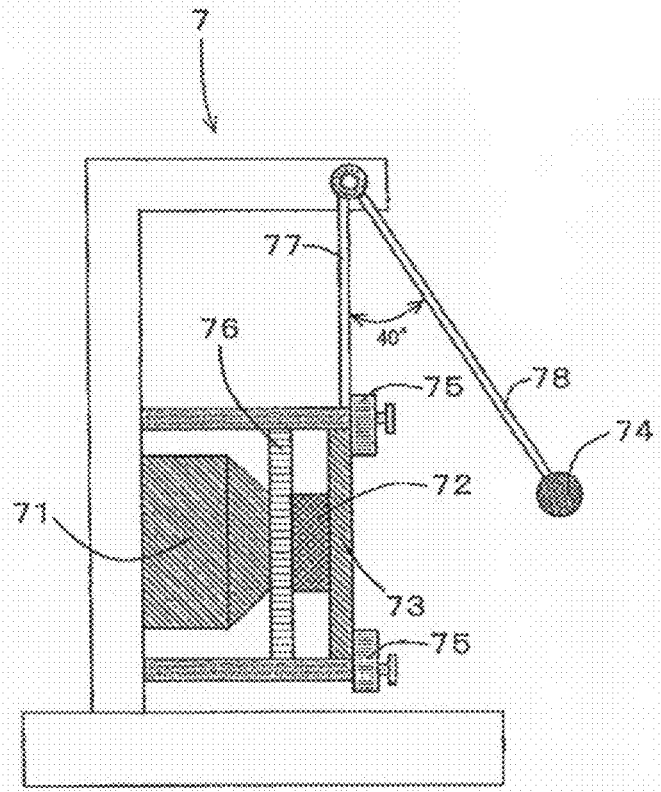
FIG. 7 is a schematic diagram of a pendulum impact tester for use in the testing of impact absorptivity.

The impact absorptivity (impact absorbing power) was determined in the following manner. With reference to FIG. 7, each test specimen (double-faced pressure-sensitive adhesive tape) was placed between and affixed to a supporting plate and an acrylic plate in the pendulum impact tester, an impact test was performed, and an impact force F1 upon the impact was measured. Independently, another impact test was performed without placing the test specimen double-faced pressure-sensitive adhesive tape between the supporting plate and acrylic plate, and an impact force F0 (blank) upon impact was measured. Based on these data, the impact absorptivity was determined according to the following equation:

Impact absorptivity(%)=$(F0-F1)/F0 \times 100$

FIG. 7 is a schematic diagram of the pendulum impact tester in which a test specimen has been arranged. In FIG. 7, the reference numerals "7" stands for the pendulum impact tester, "71" stands for a load cell, "72" stands for the test specimen (double-faced pressure-sensitive adhesive tape), "73" stands for an acrylic plate, "74" stands for an iron ball, "75" stands for a pressing force controller, "76" stands for a supporting plate, "77" stands for a supporting shaft, and "78" stands for a pendulum arm. The load cell 71 includes a pressure sensor that senses an impact force upon collision of the iron ball 74 and measures a value of impact force. The test specimen 72 is placed between the acrylic plate 73 and the supporting plate 76 so as to be positioned over the load cell 71 as illustrated in FIG. 7. The compression (compression percentage) of the test specimen 72 is adjusted by the action of the pressing force controller 75. The iron ball 74 acts as an impactor and has a diameter of 19.5 mm and a weight of 40-gram weight (0.39 newton). The iron ball 74 is raised to and once fixed at a dropping angle (rise angle) of 40°, and then dropped.

The impact absorptivity was determined in the following manner. Specifically, an impact absorptivity test was performed, per one test specimen, each three times under three test conditions, i.e., upon no compression (compression by 0%) where the test specimen was not at all compressed, upon compression by 15% where the test specimen was compressed in a thickness direction to 85% of the initial thickness, and upon compression by 30% where the test specimen was compressed in a thickness direction to 70% of the initial thickness, respectively. The average of three measurements under each test condition was defined as the impact absorptivity, and the results are shown in Table 9.

Dust Sealability

Figure 8:
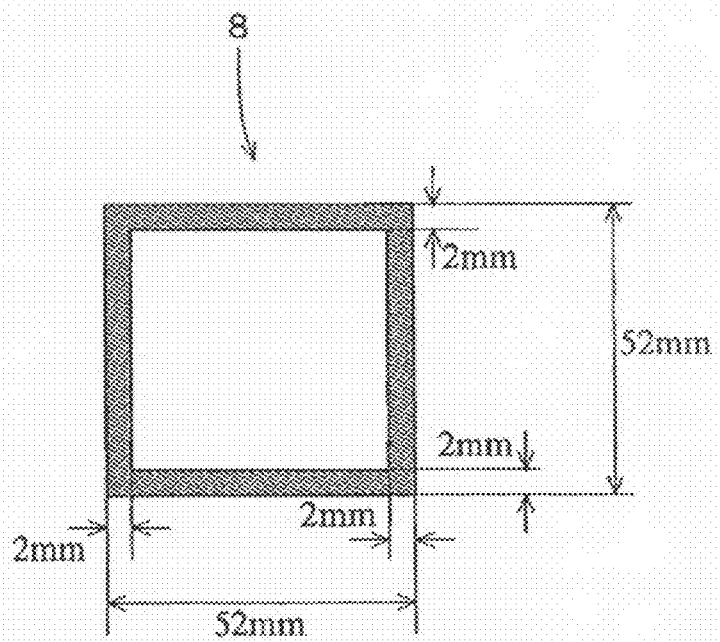
FIG. 8 is a schematic diagram of a test specimen for use in the testing of dust sealability.

Each of the double-faced pressure-sensitive adhesive tapes according to Examples 1 to 4 was punched into a frame-shaped (trim-form) piece 52 mm in outer width, 52 mm in outer length, and 2 mm in frame-width, from which the release liner was removed, and thereby yielded test specimens (corresponding to a test specimen 8 in FIG. 8). The double-faced pressure-sensitive adhesive tapes had a layer structure of (release liner)/(pressure-sensitive adhesive layer)/(foam substrate)/(pressure-sensitive adhesive layer). Likewise, a test specimen was prepared from the double-faced pressure-sensitive adhesive tape according to Comparative Example 3 in the same manner. These test specimens each correspond to a test specimen 94 in FIG. 9.

Each test specimen was used as a gasket material, and the dust sealability thereof was determined by measuring the ratio of particles passing through the test specimen using a dust-sealability testing device illustrated in FIG. 9.

In FIG. 9, the reference numerals "9" stands for the dust-sealability testing device, "91" stands for a cabinet, "92" stands for a mount, "93" stands for a testing chamber, "931" stands for a ceiling plate of the testing chamber, "932" stands for a testing chamber body, "94" stands for the test specimen (frame-shaped double-faced pressure-sensitive adhesive tape), "95" stands for a particle counter, "96" stands for a suction pump, "97" stands for an interior space of the testing chamber, and "98" stands for an exterior space of the testing chamber. The cabinet 91 isolates a system inside the dust-sealability testing device 9 from the outside. The particle counter 95 is connected to the exterior space 97 of the testing chamber in the cabinet 91. The testing chamber 93 lies over the mount 92. The testing chamber 93 includes the ceiling plate 931 and testing chamber body 932 and has a hexahedral box-like structure and has a square opening in one of the six planes. The ceiling plate 931 of the testing chamber covers the opening to isolate the interior space 97 inside the testing chamber 93 as an isolated system. The suction pump 96 and the particle counter 95 are connected to the interior space 97 of the testing chamber, respectively. The test specimen 94 is arranged so as to surround the opening of the testing chamber body 932 and to lie between the ceiling plate 931 and testing chamber body 932 of the testing chamber. The interior space 97 of the testing chamber is isolated from the exterior space 98 of the testing chamber by the test specimen 94, ceiling plate 931, and testing chamber body 932. The thickness (gap) of the test specimen 94 was controlled to be 0.12 mm.

The particles used in testing were a mixture of silica particles having an average particle diameter of 0.5 µm, silica particles having an average particle diameter of 1 µm, silica particles having an average particle diameter of 2 µm, and silica particles having an average particle diameter of 5 µm. The interior space 97 of the testing chamber was reduced in pressure by the suction pump 96, the number of particles passing through the test specimen 94 as a result of pressure reduction was measured, and the dust sealability was determined according to the following equation. The number of particles passing through the test specimen 94 can be measured by counting the number of particles in the interior space 97 of the testing chamber before and after pressure reduction and counting the number of particles in the exterior space 98 of the testing chamber before and after pressure reduction.

Dust sealability(%)=$(P_0-P_f)/P_0 \times 100$ wherein $P_0$ represents the number of particles in the exterior space 98 of the testing chamber before pressure reduction; and $P_f$ represents the number of particles moving from the exterior space 98 of the testing chamber through the test specimen 94 to the interior space 97 of the testing chamber as a result of pressure reduction.

A higher value of dust sealability approaching 100% means higher dust sealability.

The results in testing of the dust sealability are shown in Table 9. In Table 9, the symbol ">99" means the data exceeded 99%; and the symbol "–" means that no measurement was performed.

TABLE 9

|  | Halogen emission [µg/g] | | | | Impact absorptivity [%] | | | Dust sealability [%] |
| --- | --- | --- | --- | --- | --- | --- | --- | --- |
|  | F | Cl | Br | I | No compression | Compression by 15% | Compression by 30% |  |
| Example 1 | 3 | 7 | <3 | <3 | 14.3 | 15.5 | 13.5 | >99 |
| Example 2 | <3 | 9 | <3 | <3 | 15.2 | 15.4 | 14.7 | >99 |
| Example 3 | <3 | 10 | <3 | <3 | 20.3 | 15.1 | 14.2 | >99 |
| Example 4 | <3 | 9.9 | <3 | <3 | 20.4 | 15.2 | 14.3 | >99 |
| Comparative Example 3 | <3 | 230 | <3 | — | — | — | — | — |

As has been described, the double-faced pressure-sensitive adhesive tapes according to embodiments of the present invention are thin and highly waterproof.

While the above description is of the preferred embodiments of the present invention, it should be appreciated that various modifications, alternations, and variations are possible without deviating from the scope and fair meaning of the following claims.

What is claimed is:

1. A double-faced pressure-sensitive adhesive tape used for the fixation of lenses in cellular phones, comprising a foam substrate colored black; one pressure-sensitive adhesive layer arranged on or above one side of the substrate; and another pressure-sensitive adhesive layer arranged on or above the other side of the substrate, wherein the double-faced pressure-sensitive adhesive tape has a total thickness of 250 micrometers (µm) or less, a tensile strength of from 0.5 to 20 megapascals (MPa), and an elongation of from 100% to 600%, and wherein the foam substrate is a halogen-free foam substrate containing substantially no halogen compound by design.

2. The double-faced pressure-sensitive adhesive tape used for the fixation of lenses in cellular phones according to claim 1, wherein the total thickness of the tape is 200 µm or less.

3. A double-faced pressure-sensitive adhesive tape used for the fixation of lenses in cellular phones, comprising a foam substrate colored white; one pressure-sensitive adhesive layer arranged on or above one side of the substrate; and another pressure-sensitive adhesive layer arranged on or above the other side of the substrate, wherein the double-faced pressure-sensitive adhesive tape has a total thickness of 250 micrometers (µm) or less, a tensile strength of from 0.5 to 20 megapascals (MPa), and an elongation of from 100% to 600%, and wherein the foam substrate is a halogen-free foam substrate containing substantially no halogen compound by design.

4. The double-faced pressure-sensitive adhesive tape used for the fixation of lenses in cellular phones according to claim 1, wherein the total thickness of the pressure-sensitive adhesive layers arranged on both sides of the substrate is from 10 to 200 μm.

5. The double-faced pressure-sensitive adhesive tape used for the fixation of lenses in cellular phones according to claim 1, wherein the double-faced pressure-sensitive adhesive tape has a compression load by 30% of from 5 to 200 kilopascals (kPa).

6. The double-faced pressure-sensitive adhesive tape used for the fixation of lenses in cellular phones according to claim 1, wherein the double-faced pressure-sensitive adhesive tape has a push out force of from 30 to 200 newtons (N).

7. The double-faced pressure-sensitive adhesive tape used for the fixation of lenses in cellular phones according to claim 1, wherein the pressure-sensitive adhesive layer is pressure-sensitive adhesives each containing an acrylic polymer as a base polymer, wherein the main monomer component of the acrylic polymer is alkyl (meth)acrylates whose alkyl moiety having 1 to 20 carbon atoms, and wherein the amount of alkyl (meth)acrylates whose alkyl moiety having 1 to 20 carbon atoms is 60 percent by weight or more based on the total amount of monomer components for constituting the acrylic polymer.

8. The double-faced pressure-sensitive adhesive tape used for the fixation of lenses in cellular phones according to claim 1, wherein the double-faced pressure-sensitive adhesive tape shows a chlorine-containing gas emission of 50 micrograms per gram (μg/g) or less.

9. The double-faced pressure-sensitive adhesive tape used for the fixation of lenses in cellular phones according to claim 1, wherein the double-faced pressure-sensitive adhesive tape has a visible-light transmittance of 15% or less.

10. The double-faced pressure-sensitive adhesive tape used for the fixation of lenses in cellular phones according to claim 3, wherein the double-faced pressure-sensitive adhesive tape has a visible-light reflectance of 20% or more.

11. The double-faced pressure-sensitive adhesive tape used for the fixation of lenses in cellular phones according to claim 1, for waterproofing use.

12. The double-faced pressure-sensitive adhesive tape used for the fixation of lenses in cellular phones according to claim 3, wherein the total thickness of the tape is 200 μm or less.

13. The double-faced pressure-sensitive adhesive tape used for the fixation of lenses in cellular phones according to claim 9, wherein the total thickness of the tape is 200 μm or less.

14. The double-faced pressure-sensitive adhesive tape used for the fixation of lenses in cellular phones according to claim 3, wherein the total thickness of the pressure-sensitive adhesive layers arranged on both sides of the substrate is from 10 to 200 μm.

15. The double-faced pressure-sensitive adhesive tape used for the fixation of lenses in cellular phones according to claim 9, wherein the total thickness of the pressure-sensitive adhesive layers arranged on both sides of the substrate is from 10 to 200 μm.

16. The double-faced pressure-sensitive adhesive tape used for the fixation of lenses in cellular phones according to claim 9, wherein the double-faced pressure-sensitive adhesive tape has a compression load by 30% of from 5 to 200 kilopascals (kPa).

17. The double-faced pressure-sensitive adhesive tape used for the fixation of lenses in cellular phones according to claim 9, wherein the double-faced pressure-sensitive adhesive tape has a push out force of from 30 to 200 newtons (N).

18. The double-faced pressure-sensitive adhesive tape used for the fixation of lenses in cellular phones according to claim 9, wherein the double-faced pressure-sensitive adhesive tape shows a chlorine-containing gas emission of 50 micrograms per gram (μg/g) or less.

19. The double-faced pressure-sensitive adhesive tape used for the fixation of lenses in cellular phones according to claim 9, wherein the pressure-sensitive adhesive layer is pressure-sensitive adhesives each containing an acrylic polymer as a base polymer, wherein the main monomer component of the acrylic polymer is alkyl (meth)acrylates whose alkyl moiety having 1 to 20 carbon atoms, and wherein the amount of alkyl (meth)acrylates whose alkyl moiety having 1 to 20 carbon atoms is 60 percent by weight or more based on the total amount of monomer components for constituting the acrylic polymer.

20. The double-faced pressure-sensitive adhesive tape used for the fixation of lenses in cellular phones according to claim 9, for waterproofing use.

* * * * *